(12) United States Patent  
Taylor et al.

(10) Patent No.: US 7,092,452 B2
(45) Date of Patent: *Aug. 15, 2006

(54) CO-CHANNEL INTERFERENCE RECEIVER

(75) Inventors: Matthew A Taylor, Weare, NH (US); Robert B MacLeod, Nashua, NH (US); Rachel E Learned, Waltham, MA (US); Joshua D Niedzwiecki, Manchester, NH (US); Karl D Brommer, Hampton Falls, NH (US); Thomas P McElwain, Merrimack, NH (US)

(73) Assignee: Bae Systems Information and Electronic Systems Integration INC, Nashua, NH (US)

( * ) Notice: Subject to any disclaimer, the term of this patent is extended or adjusted under 35 U.S.C. 154(b) by 409 days.

This patent is subject to a terminal disclaimer.

(21) Appl. No.: 10/423,740

(22) Filed: Apr. 25, 2003

(65) Prior Publication Data

US 2003/0198305 A1    Oct. 23, 2003

Related U.S. Application Data

(63) Continuation-in-part of application No. 10/228,787, filed on Aug. 26, 2002, now Pat. No. 6,947,502, said application No. 10/423,740 is a continuation-in-part of application No. 10/105,918, filed on Mar. 25, 2002.

(60) Provisional application No. 60/398,451, filed on Jul. 24, 2002, provisional application No. 60/372,956, filed on Apr. 16, 2002.

(51) Int. Cl.
*H04B 7/02* (2006.01)

(52) U.S. Cl. ............... 375/267; 375/341; 375/343; 375/347; 375/350

(58) Field of Classification Search ............... 375/260, 375/262, 267, 340, 341, 346, 347, 348, 349, 375/350, 343
See application file for complete search history.

(56) References Cited

U.S. PATENT DOCUMENTS

| 5,371,471 | A | * | 12/1994 | Chennakeshu et al. | ..... 329/304 |
|---|---|---|---|---|---|
| 5,506,861 | A | | 4/1996 | Bottomley | |
| 5,569,439 | A | | 10/1996 | Cardini et al. | |
| 5,790,606 | A | | 8/1998 | Dent | |
| 5,867,478 | A | | 2/1999 | Baum et al. | |
| 5,982,813 | A | | 11/1999 | Dutta et al. | |
| 6,122,269 | A | | 9/2000 | Wales | |
| 6,144,710 | A | | 11/2000 | Chen et al. | |
| 6,172,970 | B1 | | 1/2001 | Ling et al. | |
| 6,198,775 | B1 | | 3/2001 | Khayrallah et al. | |
| 6,219,341 | B1 | | 4/2001 | Varanasi | |

(Continued)

OTHER PUBLICATIONS

Wang, Xiaodong, Interative (Turbo) Soft Interference Cancellation and Decoding for Coded CDMA, IEEE Transactions on Communications, Jul. 1999, pp. 1046-1061, vol. 47, No. 7.

(Continued)

*Primary Examiner*—Don N. Vo
(74) *Attorney, Agent, or Firm*—Maine & Asmus

(57) ABSTRACT

A digital receiver automatically detects and non-coherently demodulates a multiplicity of interfering digitally modulated signals transmitted simultaneously at approximately the same carrier frequency. The receiver includes one or more antenna inputs (e.g., polarization and/or space diverse), a parameter estimator module, and a multiuser detector for estimating the data transmitted by each interfering signals and adapted to operate with at least one of a MUD algorithm with partially quantized prior information and a MUD algorithm based on prewhitened data.

25 Claims, 14 Drawing Sheets

U.S. PATENT DOCUMENTS

| | | |
|---|---|---|
| 6,377,611 B1 | 4/2002 | Hwang |
| 6,466,566 B1 * | 10/2002 | De Gaudenzi et al. ..... 370/342 |
| 2002/0037061 A1 | 3/2002 | Learned |
| 2002/0037737 A1 | 3/2002 | Learned et al. |

OTHER PUBLICATIONS

Fu, Hongyi, Blind Channel and Carrier Offset Estimation in Multiuser CDMA, IEEE, 2002, pp. 21-25.

Alexander, Paul, D., Interative Multiuser Interference Reduction: Turbo CDMA, IEEE Transactions on Communications, Jul. 1999, pp. 1008-1014, vol. 47, No. 7.

Verdu, Sergio, Minimum Probability of Error for Asynchronous Gaussian Multiple-Access Channels, IEEE Transactions on Information Theory, Jan. 1986, pp. 85-96 vol. IT-32, No. 1.

Lupas, Ruxandra, Linear Multiuser Detectors for Synchronous Code-Divison Multiple-Access Channels, IEEE Transactions on Information Theory, Jan. 1989, pp. 123-136, vol. 35, No. 1.

Lupas, Ruxandra, Near-Far Resistance of Multiuser Detectors in Asynchronous Channels, IEEE Transactions on Communications, Apr. 1990, pp. 496-508, vol. 38, No. 4.

Varanasi, Mahesh, K., Near-Optimum Detection Synchronous code-Division Multiple-Access Systems, IEEE Transactions on Communications, May 1991, pp. 725-736, vol. 39, No. 5.

Duel-Hallen, Alexandra, Decorrelating Decision-Feedback Multiuser Detector for Synchronous Code-Division Multi-Access Channel, IEEE Transactions on Communications, Feb. 1993, pp. 285-290, vol. 41, No. 2.

Wei, Lei, Synchronous DS-SSMA System with Improved Decorrelating Decision-Feedback Multiuser Detection, IEEE Transactions on Vehicular Technology, Aug. 1994, pp. 767-772, vol. 43, No. 3.

PCT International Search Report dated Jul. 11, 2003 of International Application No. PCT/US03/12917 filed Apr. 25, 2003.

* cited by examiner

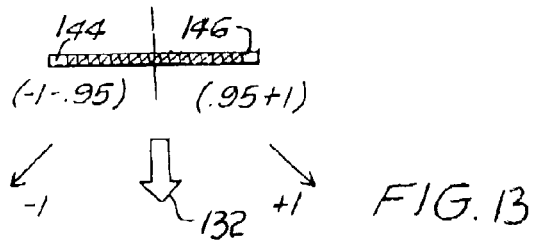
FIG. 13
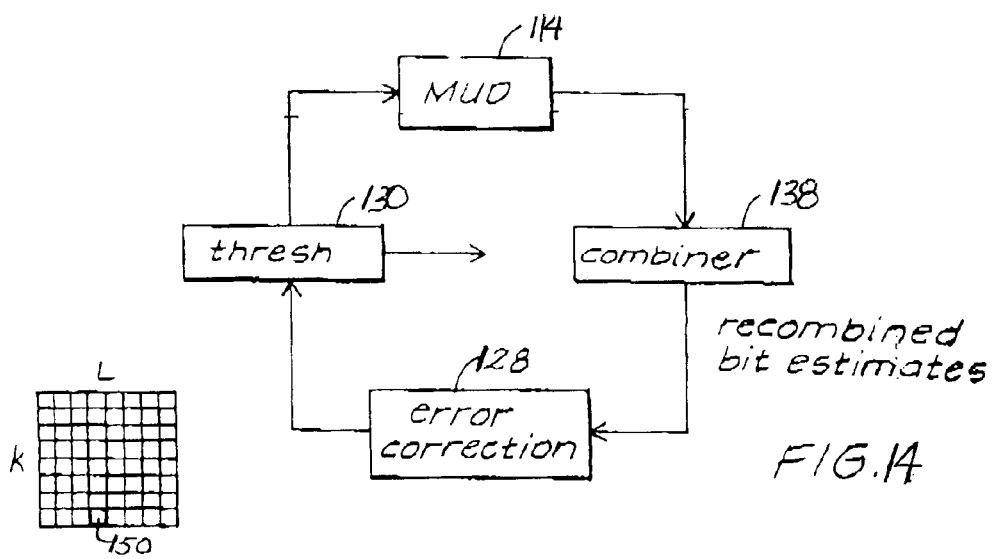
FIG. 14
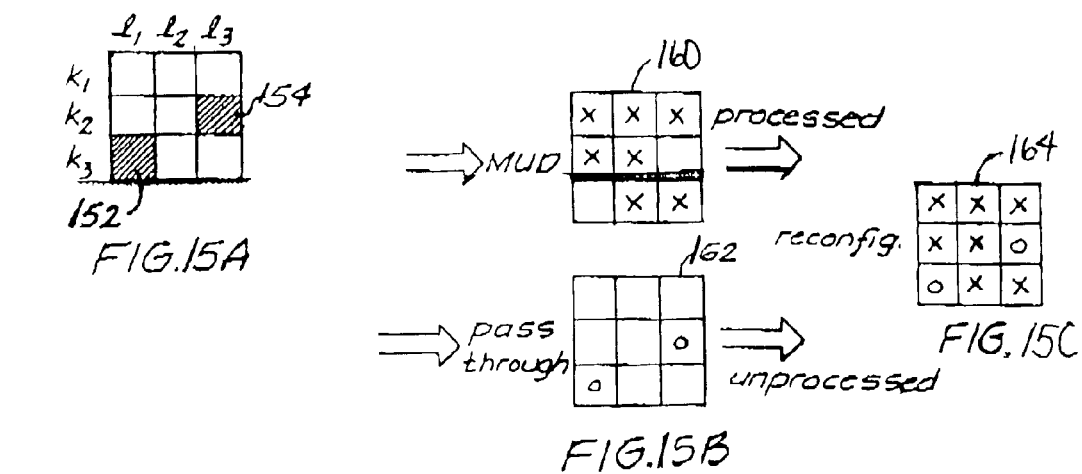
FIG. 15A
FIG. 15B
FIG. 15C

CO-CHANNEL INTERFERENCE RECEIVER

RELATED APPLICATIONS

This application claims the benefit of U.S. Provisional Application No. 60/398,451, filed Jul. 24, 2002. This application is a continuation-in-part of U.S. application Ser. No. 10/228,787 filed Aug. 26, 2002, which claims priority to U.S. Provisional Application No. 60/372,956, filed Apr. 16, 2002. This application is also a continuation-in-part of U.S. application Ser. No. 10/105,918, filed Mar. 25, 2002. This application is related to U.S. application Ser. No. 10/423,695, filed Apr. 25, 2003, This application is related to U.S. application Ser. No. 10/423,655, filed Apr. 25, 2003. Each of these applications is herein incorporated in its entirety by reference.

STATEMENT OF GOVERNMENT INTEREST

The present invention was made with United States Government support under a United States Government Contract. The United States Government has certain rights in this invention.

FIELD OF THE INVENTION

The invention relates to wireless communications, and more particularly, to a wireless digital signal receiver for applications where recovery of digital signals corrupted by co-channel interference from similarly modulated interfering signals is desirable.

BACKGROUND OF THE INVENTION

Wireless networks are employed for communication between various devices, such as cell phones and computers. Digitally modulated signals such as binary phase shift keyed and quadrature phase shift keyed signals are transmitted between nodes of the network. Examples include satellite communications networks where terminals transmit through satellite transponders, terrestrial systems where terminals transmit through repeating towers, and indoor local area networks where terminals transmit through central repeating elements.

Computer elements connected to these networks provide a variety of user services. Examples include telephone traffic with digital voice encoding, video conferencing, wide area computer network connectivity, and internet service. In such applications, it is desirable to maximize the network traffic capacity in a given bandwidth in the presence of interference and noise.

To that end, a variety of schemes exist for efficiently partitioning the network elements into communication channels. For example, frequency domain multiple access (FDMA) schemes assign each network terminal to a separate, non-overlapping frequency band. Time domain multiple access (TDMA) schemes assign each terminal to a separate non-overlapping time slot. Code division multiple access (CDMA) schemes assign each terminal to a separate modulating waveform so that the cross correlation between each terminal is negligible.

Such schemes are inefficient in that given sufficient signal to noise ratio or coding redundancy, more communicators could use the allocated bandwidth if provided with a means for detecting the excess signal margin, as well as a means for demodulating signals in the presence of interference. In short, despite the advancements in wireless transmission and reception, conventional systems do not properly account for the real world wireless communication signals that suffer from signal degradation such as interference and multipath problems.

More specifically, a real world multiuser system includes a number of independent users simultaneously transmitting signals. Each of these transmissions are associated with real-time problems of multipath and co-channel interference that manifest in the received signals. Multipath occurs when a signal proceeds to the receiver along not one but many paths so that the receiver encounters echoes having different and randomly varying delays and amplitudes. Co-channel interference refers to signals received from other users.

A multiuser detection (MUD) receiver can be used to jointly demodulate co-channel interfering digital signals. In general, MUD refers to the detection of data in non-orthogonal multiplexes. MUD processing increases the number of information bits available per chip or signaling dimension for interference limited systems. Optimal MUD based on the maximum likelihood principle operates by comparing the received signal with the entire number of possibilities that may have occurred at the ensemble of transmitters, to give rise to the waveform received at the receiver.

However, for multiuser detectors that examine a larger capacity of signal, the computations are complex and time-consuming, thus making real-time operation impractical. Reduced complexity approaches based on conventional tree-pruning algorithms help to some extent. However, performance of such multiuser detection algorithms degrades as the parameter M (pruning factor) is decreased, but M governs the number of computations required. Thus, to combat improper pruning, basic tree-pruning must ensure that M is large enough. As a result, conventional pruning methods are still associated with increased complexity, particularly when the number of interfering signals is moderate to large.

What is needed therefore are techniques for allowing multiple users to operate in the same communication channel. Such techniques should accurately separate co-channel signals and reduce complex processing.

BRIEF SUMMARY OF THE INVENTION

One embodiment of the present invention provides a co-channel interference receiver. The receiver includes a multiuser detector module that is adapted to receive a complex signal that contains information from K co-channel interfering signals. The receiver further includes a parameter estimation module that is adapted to receive the complex signal, and to generate estimated signature waveforms of each of the K co-channel interfering signals. The estimated signature waveforms are provided to the multiuser detector thereby enabling demodulation of the K co-channel interfering signals. Note that the multiuser detector module and the parameter estimation module can each be adapted to receive a plurality of complex signals.

The multiuser detector module is configured to operate, for example, with an algorithm with partially quantized prior information. Alternatively, the multiuser detector module is configured to operate with an algorithm based on prewhitened data. Alternatively, the receiver may be configured to operate with both algorithms. In one such embodiment, the algorithm with partially quantized prior information is a low complexity linear MMSE algorithm. In another such embodiment, the algorithm based on prewhitened data in one of an M-algorithm and T-algorithm.

The receiver may further include an analog front end that is operatively coupled to the multiuser detector module and the parameter estimation module. The analog front end is adapted to receive one or more composite waveform signals each from a plurality of transmitters, and to convert each received composite waveform signal to a corresponding complex signal. In one such embodiment, the analog front end includes one or more analog to digital converters, each adapted to convert a received composite waveform to a digital waveform, and also includes one or more downconverters, each operatively coupled to a respective analog to digital converter, and adapted to translate frequency associated with a received composite waveform to a lower frequency.

The analog front end may further include one or more antennas each configured to receive a corresponding composite waveform signal from the plurality of transmitters. In one such embodiment, the one or more antennas is a singly polarized antenna. Alternatively, the one or more antennas is a dual polarized antenna adapted with two polarization ports, thereby providing polarization diversity. Alternatively, the one or more antennas include two or more dual polarized antennas, each adapted with two polarization ports, thereby providing space and polarization diversity.

In an embodiment where the multiuser detector module is configured to operate with the low complexity linear MMSE algorithm with partially quantized prior information, the multiuser detector module includes a turbo MUD module, a combiner module, an error correction module, and a thresholding module. The turbo MUD module is adapted to provide estimates of individual bits for each of the K co-channel interfering signals. The estimates are iteratively applied in a feedback loop, which includes the error correction module, until an error rate associated with the bits drops below a predetermined figure. The combiner module is operatively coupled to the turbo MUD, and is adapted to combine recomputed bit estimates output by the turbo MUD with quantized bit values on a next iteration. The thresholding module is operatively coupled to the output of the error correction module, and is adapted to assign a quantized value for each bit estimate above a predetermined threshold, and to pass through those quantized bit values to the combiner module, thereby enabling partially quantized prior information. In one such embodiment, the error correction module on each subsequent iteration processes a combination of recomputed bit estimates output by the turbo MUD and quantized bit values output by the thresholding module, and provides its output back to the turbo MUD through the thresholding module, thereby reducing the number of uncertain bit estimates with every iteration.

In an embodiment where the multiuser detector module is configured to operate with the low complexity M-algorithm based on prewhitened data, the multiuser detector module includes a matched filter, a whitener designer module, an asynchronous whitener module, and a symbol hypothesis testing module. The matched filter is adapted to prewhiten complex signals received by the receiver, thereby partially decoupling users from multiple access interference. The whitener designer module is operatively coupled to the parameter estimator, and is adapted to develop a model of each received complex signal based on parameter estimates from the parameter estimator, and to compute an asynchronous whitener module that whitens filtered data output by the matched filter. The symbol hypothesis testing module is operatively coupled to the whitener designer module, and configured to receive whitened data output by the asynchronous whitener module. The symbol hypothesis testing module is adapted to conduct symbol hypothesis testing based on sequential evaluation of metric characterizing likelihood of hypotheses. In one such embodiment, the whitener designer module employs a square-root factorization. For example, the whitener designer module utilizes a correlation matrix provided by the parameter estimation module to compute a diagonally loaded Cholesky Factorization, which is used for whitening in the whitening module, and is also used in hypothesis testing in the symbol hypothesis testing module. Alternatively, the whitener designer module employs a QR factorization using Householder transformations. In addition, the whitener designer module can employ Hyperbolic Householder transformations to efficiently update the asynchronous whitener module when only received energies and/or phases change between symbol periods.

The parameter estimates of the parameter estimation module can be used to model a channel associated with each received complex signal, thereby enabling application of the matched filter and development of an asynchronous decorrelating filter bank. In one embodiment, the parameter estimation module includes a training sequence locator module, a noise estimator module, and a signature waveform estimator module, an active user tester module, a transformation matrix rebuilder module. The training sequence locator module is adapted to estimate a training sequence location index in each frame of the received complex signal. The noise estimator module is adapted to calculate an estimate of an average noise power in the received complex signal in accordance with the training sequence location index. The signature waveform estimator module is adapted to estimate signature waveforms unique to each user in the received complex signal in accordance with the training sequence location index and a transformation matrix. The active user tester module is operatively coupled to an output of the noise estimator module and to an output of the signature waveform estimator module, and is adapted to determine a number of active users associated with the received complex signal. The transformation matrix rebuilder module is operatively coupled to the active user tester module and to pre-stored known training sequences for each user, and is adapted to generate the transformation matrix used by the signature waveform estimating module.

Another embodiment of the present invention provides a method for receiving a complex signal that contains information from K co-channel interfering signals. The method includes estimating signature waveforms of each of the K co-channel interfering signals, and processing the complex signal based on the signature waveforms with at least one of: a low complexity linear MMSE algorithm with partially quantized prior information, and a low complexity M-algorithm based on prewhitened data. In one such embodiment, the low complexity linear MMSE algorithm with partially quantized prior information includes eliminating from each processing iteration consideration of those bits having an estimate value that exceeds a predetermined threshold, wherein bit estimates exceeding the threshold are considered certain. In another such embodiment, the low complexity M-algorithm based on prewhitened data includes filtering the complex signal, thereby partially decoupling users from multiple access interference and providing prewhitened data. The method proceeds with developing a model of the received complex signal based on parameter estimates, computing an asynchronous whitener based on the model for whitening the prewhitened data, and conducting symbol hypothesis testing based on sequential evaluation of metric characterizing likelihood of hypotheses.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 13 is a diagrammatic illustration of example thresholding performed by the system of FIG. 12.

FIG. 14 is a block diagram illustrating example thresholding and combining performed by the system of FIG. 12.

FIG. 15A is a schematic diagram of two of the bits in an example K by L matrix of FIG. 14 having certain values.

FIG. 15B is a diagrammatic illustration of example processing of the values from the matrix of FIG. 14.

FIG. 15C is a diagrammatic illustration of MUD signals which are processed on a next iteration combined with unprocessed signals so as to provide the error correction unit of FIG. 14 with appropriate estimates.

DETAILED DESCRIPTION OF THE INVENTION

Figure 1:
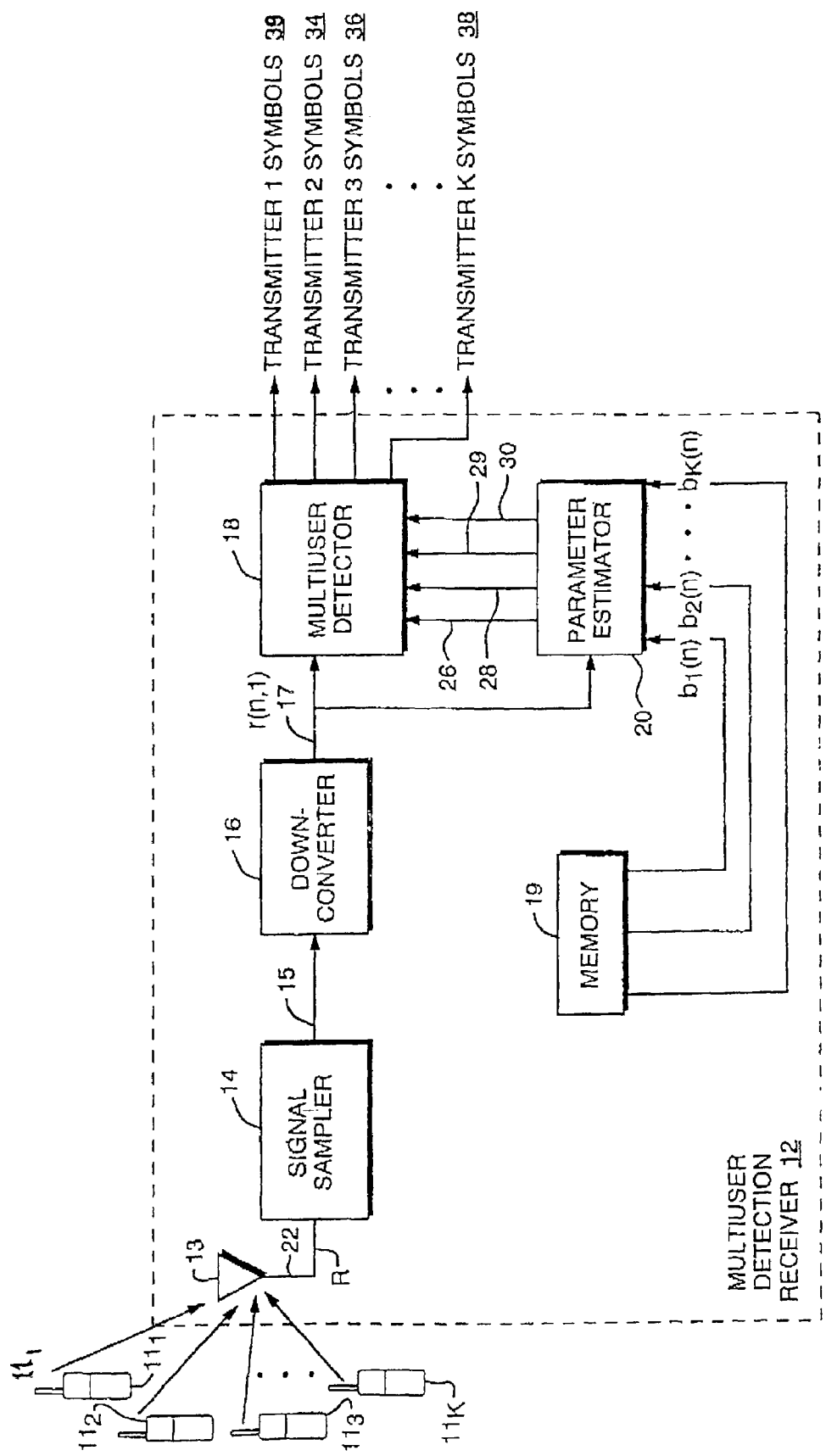
FIG. 1 is a system block diagram of a Communication System having a Multiuser Detection Receiver configured in accordance with one embodiment of the present invention.

In present day communication systems, a central controller normally assigns one communicator to each channel, during a communication channel setup period. Channels may be some combination of a time slot, a frequency, and a spreading code. In most systems, channels are re-used in distant regions, thereby giving rise to co-channel interference. If there is a large distance between the regions wherein the re-use occurs, then signal attenuation reduces the co-channel interference to tolerable levels. This is a necessary result, as conventional receivers cannot demodulate a signal in the presence of significant co-channel interference.

A Co-Channel Interference Receiver configured in accordance with the principles of the present invention can jointly demodulate two or more signals transmitted on the same channel. Systems utilizing an embodiment of the Co-Channel Interference Receiver could use a similar channel setup format, but the channel assignments would not be limited to a single communicator per channel in any given region. More specifically, when all available channels are filled with one user per channel, the central controller can begin filling new channel requests by adding the new communicator to an already occupied channel.

This will slightly degrade the bit error rate of the first communicator. The central controller may optionally direct the transmitters on this channel to increase transmit power to bring the bit error rate back down. Alternatively, the central controller may optionally direct the transmitters and receivers on this channel to decrease the bandwidth to bring the bit error rate back down.

In addition, the receiver of the present invention is configured to receive data using spatially diverse and or polarization diverse antennas. Both concepts are within the scope of the invention, as well as the use of a single antenna. Encompassing more than one polarization port allows the transmitter to transmit in both polarizations and in the event of significant multipaths or electromagnetic scattering, both polarizations may be received and processed even though only one was transmitted. Polarization and/or space diversity increases the number of dimensions in the signal space, which effectively increases the distance between constellation points. As a result, the bit error rate is improved.

Embodiments of the invention can be used in several applications. One such application is a co-channel communications system for airborne-to-ground communications, where the system simultaneously receives signals from several independent communication networks transmitting similarly modulated data on nearly identical carrier frequencies. The main beam area coverage can be low density (e.g., 10,000 square kilometers) or high density (e.g., 100 square kilometers). Consider, for example, a main beam covering 28 base stations and a frequency reuse factor of 7, where there are 8 users per base station, with 4 of the base stations operating on the same frequency. Such a system would receive up to 224 users' downlink signals, and a variety of signal types originating from diverse sources would need to be processed by a single receiver.

Another example co-channel system application is a terrestrial frequency communications receiver simultaneously receiving signals from elements of the same communication network employing frequency reuse. The communications network might be, for instance, a packet radio network, a cell phone network, or a wireless local area network. Due to inadvertent positioning of the network elements, the network is degraded by interference.

While the discussion herein illustrates wireless communication applications, the principles of the present invention are equally applicable to wired cable systems and local area networks, read/write operations of a disc drive or other storage devices, satellite communications, and any application that benefits from manipulating digital data from among many multiple sources.

Co-Channel Interference Receiver

Referring to FIG. 1, a system block diagram is shown of a Communication System 10 comprising a Multiuser Detection (MUD) Receiver 12 and a plurality of User Transmitters $11_1$ to $11_K$, which are all simultaneously transmitting co-channel, interfering digital signals, all on the same frequency, all using the same type of modulation scheme such as digital phase shift key (PSK) or quadrature amplitude modulated (QAM) signals, with the same nominal data rate.

Each of the User Transmitters $11_1$ to $11_K$ has a unique, known training sequence. The training sequences are roughly aligned as received at a Receiver Antenna 13, so that the training sequences mostly overlap. This type of synchronization is normally provided in communication systems through the use of a synchronization signal transmitted from a unit co-located with the MUD receiver 12. Alignment of the symbol transitions is not required.

In this particular embodiment, the MUD Receiver 12 an analog front end that includes the Antenna 13, a Signal Sampler 14, and a Downconverter 16, and the output (e.g., baseband signals or other lower frequency versions of the received signals) of the Downconverter 16 are fed to a Multiuser Detector 18 and a Parameter Estimator 20 which estimates the signature waveforms for each user.

K signals from the User Transmitters $11_1$ to $11_K$ are received by the Antenna 13 as the sum of the signals from Transmitters $11_1$ to $11_K$. The Antenna 13 is a singly polarized antenna with a single connection to the Signal Sampler 14. This connection is made, for example, by a transmission line or Waveguide 22 that connects from one Antenna 13 to one Signal Sampler 14.

The Signal Sampler 14 may be embodied by an analog-to-digital converter (A/D). The output of the Signal Sampler 14 is a Snapshot 15 of the sampled waveform (R) received from the Antenna 13 and this Snapshot 15 is composed of at least the number of samples in two frames of data. Alternately, the snapshot 15 may be composed of the number of samples in several frames of data. The Snapshot 15 is fed to a Downconverter 16, which is typically used in digital radios to translate the frequency of the received signal, R, to baseband. The output 17 of the Downconverter 16 is a complex baseband signal, r(n, 1), which contains information from all K co-channel interfering signals in the same frequency and time space.

The baseband signal, r(n, 1), is sent to the Parameter Estimator 20. The Multiuser Detector 18 jointly demodulates the co-channel interfering digital signals, using information provided by the Parameter Estimator 20. The Parameter Estimator 20 uses knowledge (stored in Memory 19) of the unique training symbols transmitted by User Transmitters $11_1$ to $11_K$, and contained in the composite received signal r(n, 1) to solve for the signature waveforms of the K signals. The term "signature waveform" is herein used to denote the impulse response of the channel through which the signal passes. The term "channel" is used herein to include not only the propagation channel and antenna effects, but also any filtering used in the transmitters $11_1$ to $11_K$ and Receiver 12 front end. In addition, in a direct sequence spread spectrum system, it would also include the spreading code.

The optimal Multiuser Detector 18 is one that minimizes the mean square error between the received signal and all possible combinations of each users transmitted data symbols transformed by their unique signature response. This optimal Multiuser Detector 18 can be expressed mathematically as follows:

$$\hat{d}_{ML} = \underset{d \in \Omega}{\operatorname{argmin}} \left\{ E\{\|r(n, p) - \sum_{k=1}^{K} d_k(n) * s_k(n, p)\|^2\} \right\} \quad (1)$$

where $\Omega$=the constraint set of all possible combinations of transmitted data symbols. A number of low complexity MUD algorithms are described herein.

The purpose of the Parameter Estimator 20 is to supply the Multiuser Detector 18 with the information needed to solve Equation 1. The signature waveforms 30, which are unique to each user and each diversity port, describe the transformation of each user's transmitted symbols as they propagate from Transmitters $11_1$ to $11_K$ to Receiver 12. This includes pulse shape filtering on the Transmitters $11_1$ to $11_K$ and receiver filtering on the Receiver 12. Some multiuser detectors may also require information about the location of the training sequence in each frame of data for synchronization, and they may also require information about the noise power in the received signal to make better estimates of the transmitted symbols for each user. The Parameter Estimator 20 may be configured to calculate such parameters, and therefore, will operate with any Multiuser Detector 18 that requires these inputs.

In one embodiment, the Parameter Estimator 20 generates outputs that occur once per snapshot and contain parameter estimates for each frame of data in that snapshot. These parameter estimates include estimated signature waveforms 30, $\hat{s}_{k_a}(n, p, m)$, for each diversity port (p), frame (m), and active user ($k_a$). The outputs also include an estimated noise power 26 $\hat{\sigma}^2(p)$, which is a scalar that represents the average power of the noise and a training sequence index 28, $\tau_{TS}$, which is a pointer to the location of the training sequence in each frame of the snapshot 15. The outputs also include an active users vector 29 (u(k)) that contains the state of each user, k. State refers to the user being "actively transmitting" or "not transmitting".

The outputs of the Parameter Estimator 20 are sent to the MUD 18, which also receives the r(n, 1) baseband signal 17, and produces separate streams of transmitter I symbols 39 to transmitter K symbols 38 for signal 1, signal 2, up to signal K which correspond to each of the K co-channel interfering signals sent by Transmitters $11_1$ to $11_K$. The system may further include additional post-MUD processing componentry (not shown) adapted to receive the outputs of the MUD 18, such as frequency mismatch compensation modules, block error decoding modules, demultiplexing or depacketizing modules, and routing modules.

Polarization Diversity MUD

Figure 2:
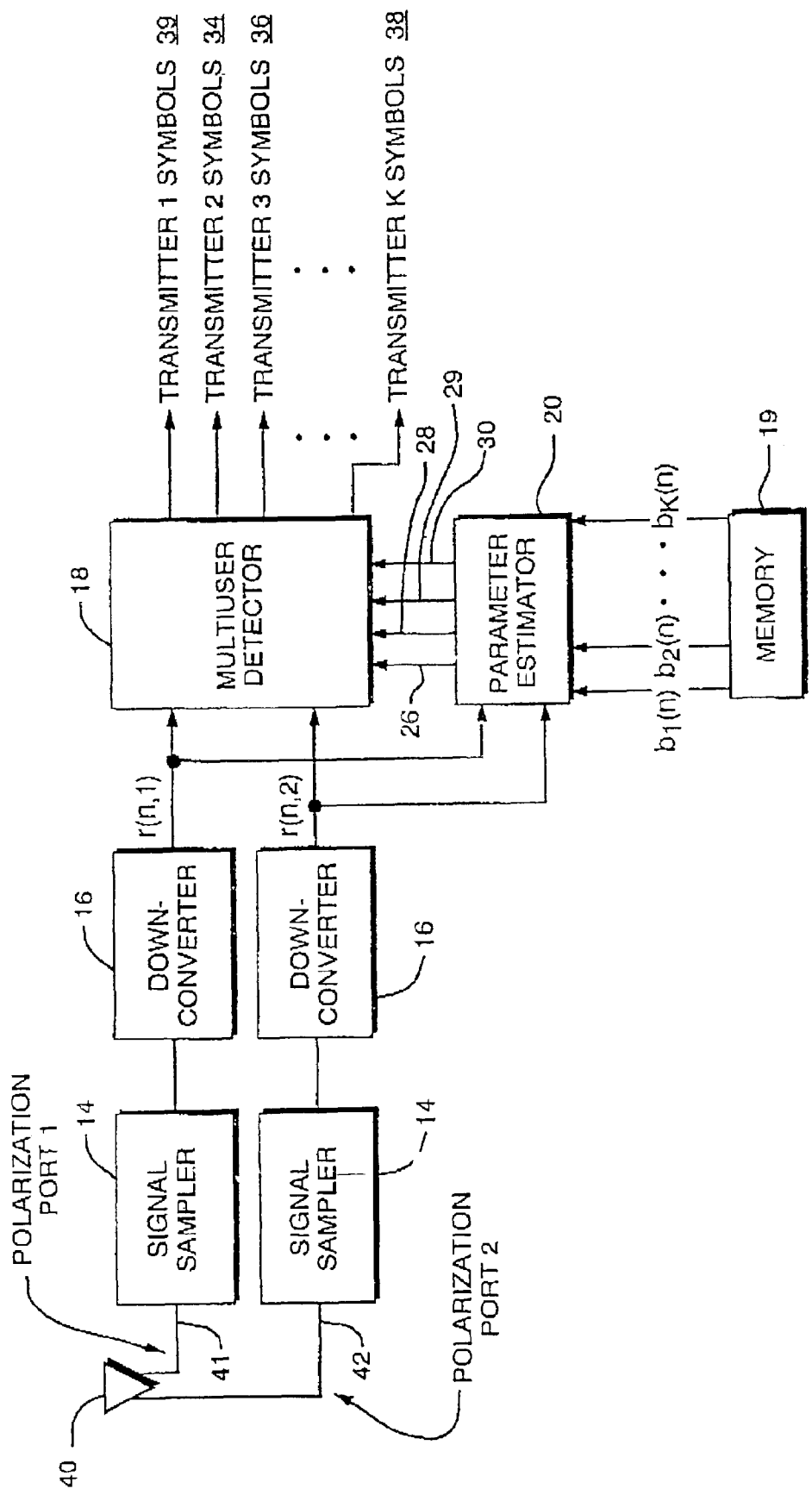
FIG. 2 illustrates a Multiuser Detection Receiver having a dual polarized antenna in accordance with another embodiment of the present invention.

FIG. 2 illustrates a Multiuser Detection Receiver having a dual polarized antenna in accordance with another embodiment of the present invention. The inclusion of a Dual Polarized Antenna 40 provides more information to the Multiuser Detector 18, to make better symbol decisions, thereby reducing the symbol error rate. This extra information derives from the fact that the signals received by orthogonally polarized antenna ports travel through effectively different channels. The Parameter Estimator 20 will provide to the Multiuser Detector 18 the signature waveforms 30 for each user "k" received by both antenna ports (p=1,2). Hence, there will be K×2 signature waveforms 30 passed to the Multiuser Detector 18. Therefore, the MUD 18 will have twice as many equations compared to only one polarization, but the same number of symbols for which to solve.

The use of a dual polarized antenna will be of benefit, for example, in the following two cases: first, where the signal is transmitted in dual orthogonal polarizations, and second, where electromagnetic scattering causes significant cross polarized energy to be received at the Receive Antenna 40, even though only one polarization was transmitted.

Space and Polarization Diversity MUD

Figure 3:
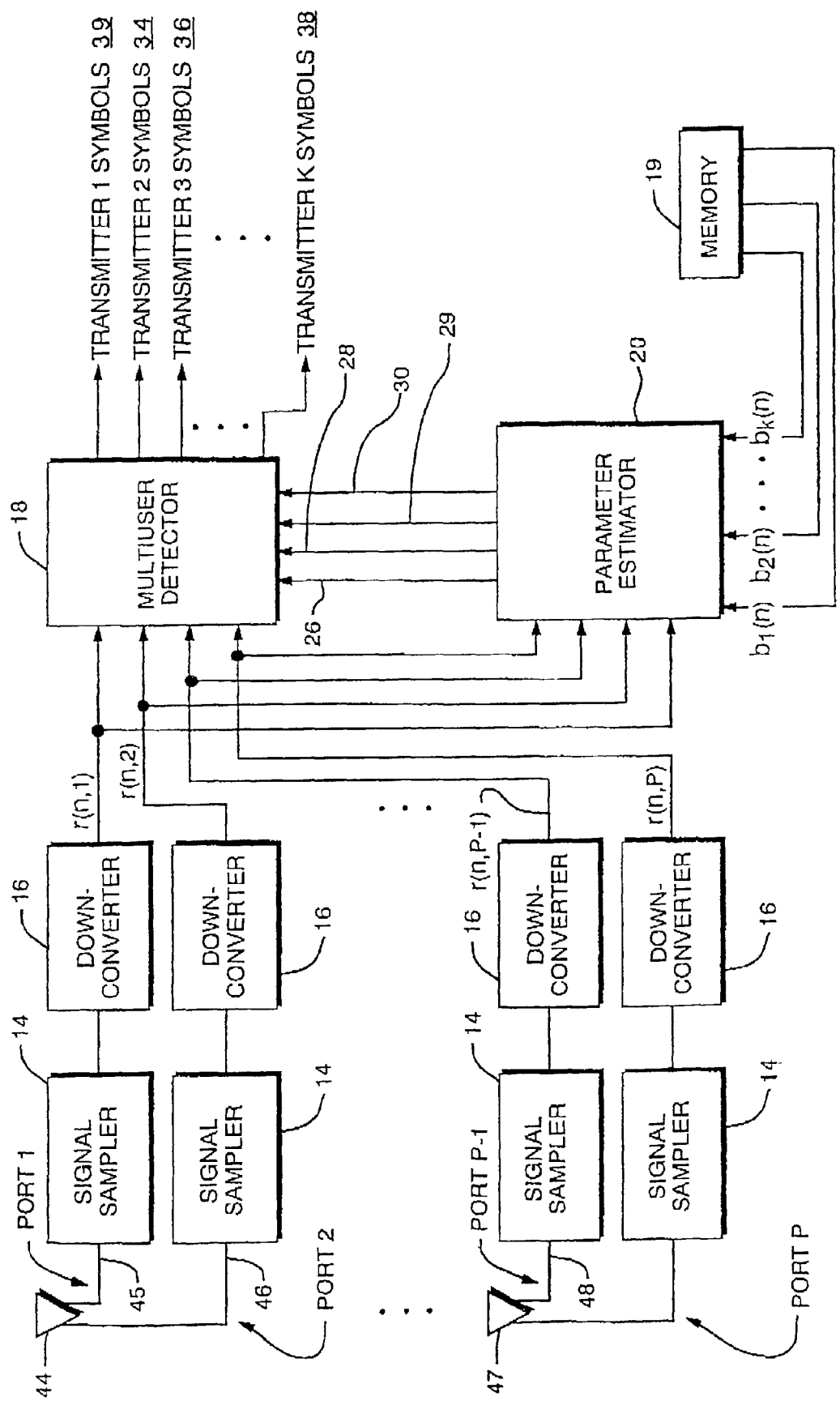
FIG. 3 illustrates a Multiuser Detection Receiver having more than one antenna, each antenna having one or two polarizations in accordance with another embodiment of the present invention.

FIG. 3 illustrates a Multiuser Detection Receiver having more than one antenna, each antenna having one or two polarizations in accordance with another embodiment of the present invention. The inclusion of extra antenna ports provides even more information to the MUD 18, enabling it to make better symbol decisions, thereby reducing the symbol error rate. In order to provide added benefit, the extra antennas must be space diverse. In other words, the antennas must be spaced far enough apart that they provide a significantly different propagation channel. In this case, the Parameter Estimator 20 processes the signal r(n,p), where p=1, 2, . . . P and produces K×P signature waveforms 30 to pass to MUD 18.

Frame Structure and Training Sequence Sliding Search Windows

Figure 4:
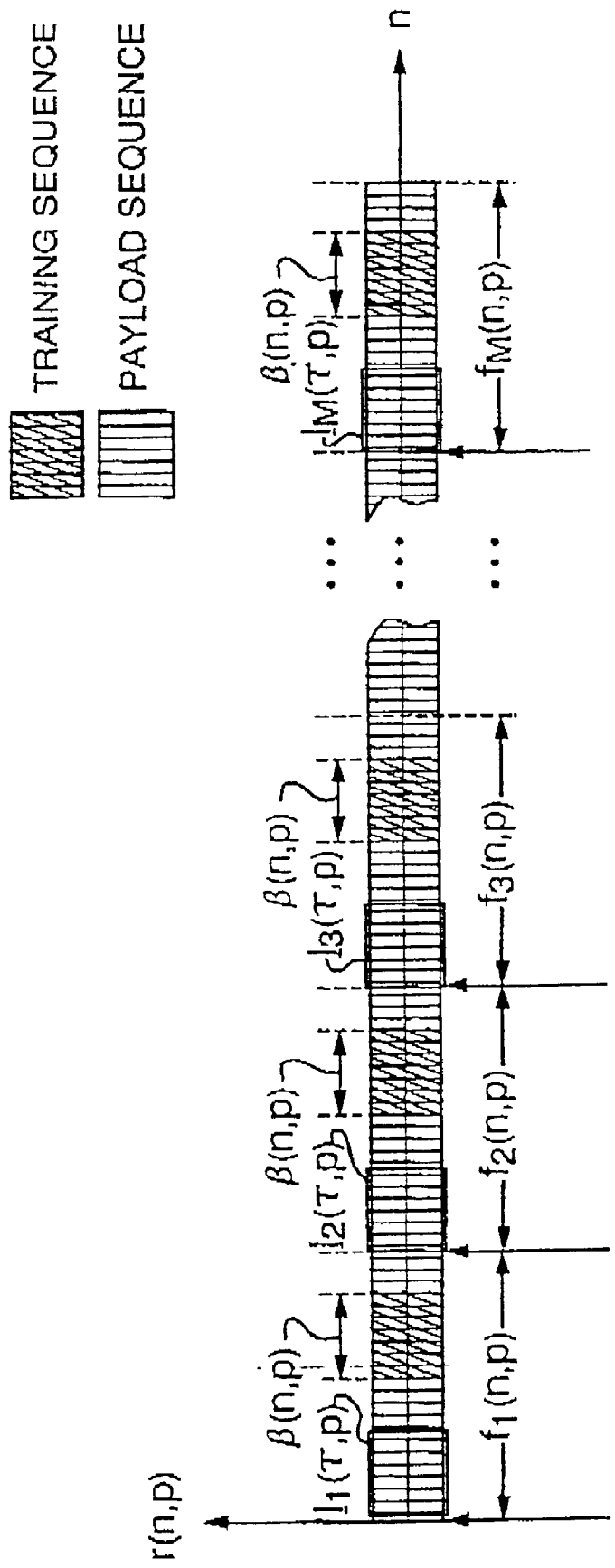
FIG. 4 is a diagram of the frame structure underlying the received baseband signal for the case of two or more co-channel interfering signals for a given diversity port signal and also shows training sequence sliding search windows for use in the training sequence locator, in accordance with one embodiment of the present invention.

FIG. 4 is a diagram of the frame structure underlying the received baseband signal r(n,p) for the case of multiple (K) co-channel interfering signals for a given diversity port signal "p", showing a sequence of framed segments $f_m(n,p)$ having a received composite training sequence $\beta(n,p)$, at the same location of each frame segment, and also shows training sequence sliding search windows ($l_m(\tau,p)$) for use in the training sequence locator.

In one embodiment, the received composite training sequence, $\beta(n,p)$, is defined as the complex baseband version of the sum of each users training sequence, $b_k(n)$, convolved (indicated by an asterisk) with its respective signature waveform, $s_k(n,p)$, plus additive white Gaussian noise, w(n,p). This relation is defined mathematically as follows:

$$\beta(n, p) = \sum_{k=1}^{K} b_k(n) * s_k(n, p) + w(n, p) \quad (2)$$

Figure 6:
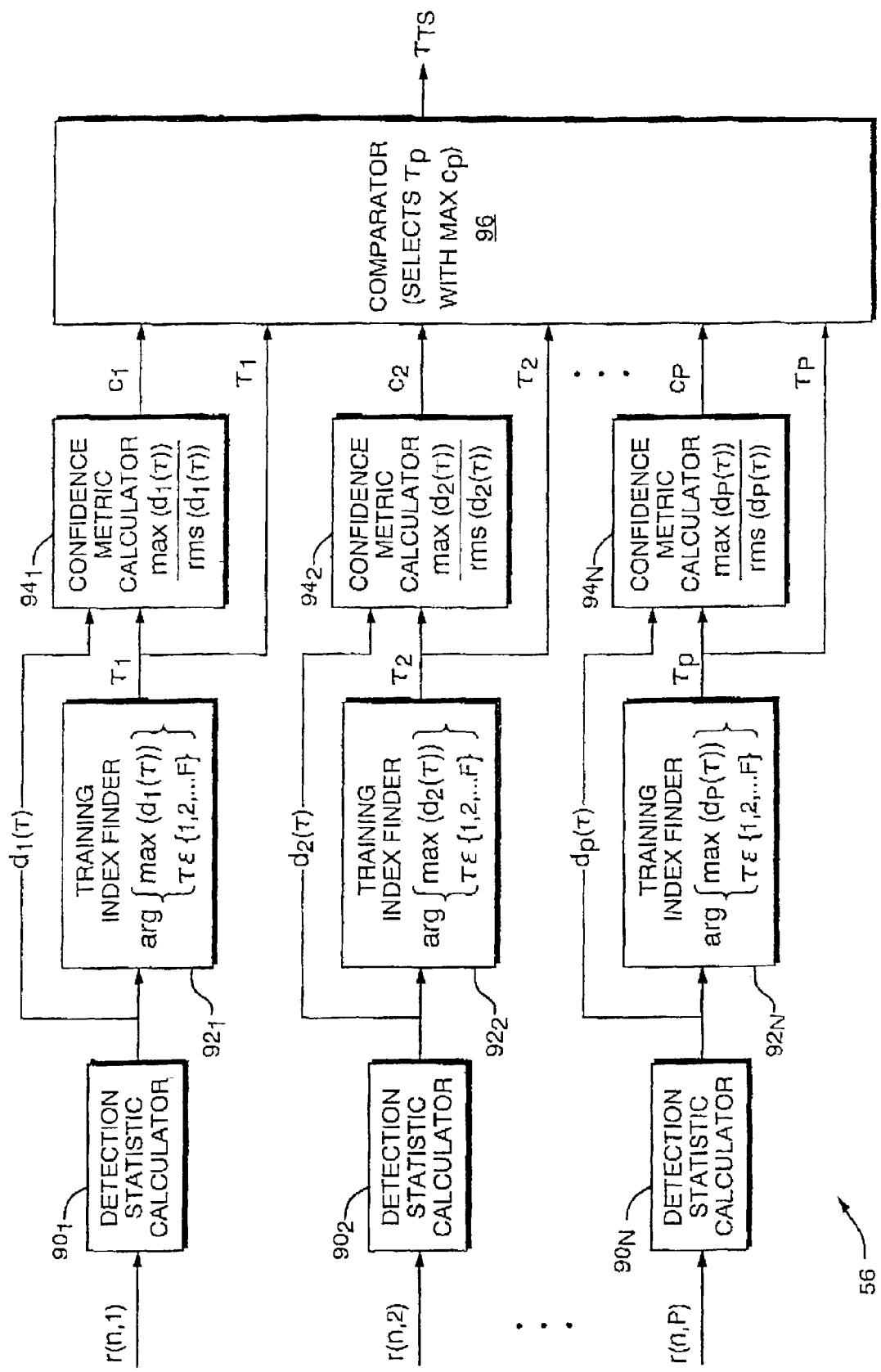
FIG. 6 is a flow chart of a Training Sequence Locator component configured in accordance with one embodiment of the present invention.

FIG. 4 also shows the training sequence sliding search windows, $l_m(\tau,p)$, for use in the training sequence locator. In particular, the training sequence sliding search windows are used by the Detection Statistic Calculator $90_p$, which is part of the Training Sequence Locator 56 (FIG. 6). These sliding search windows are L samples long, where L is the number of samples in a received composite training sequence, $\beta$ (n,p). The first index of each sliding search window is separated by F samples, where F is the number of samples in a frame of data. Each sliding search window, $l_m(\tau,p)$, is moved across a corresponding frame of received data, $f_m(n,p)$, shifted one sample at a time for a total of F sample shifts. For each sample shift, $\tau$, the data in each sliding search window, $l_m(\tau,p)$, is used by the Detection Statistic Calculator 90 to calculate the corresponding value of the detection statistic.

Parameter Estimation

Figure 5:
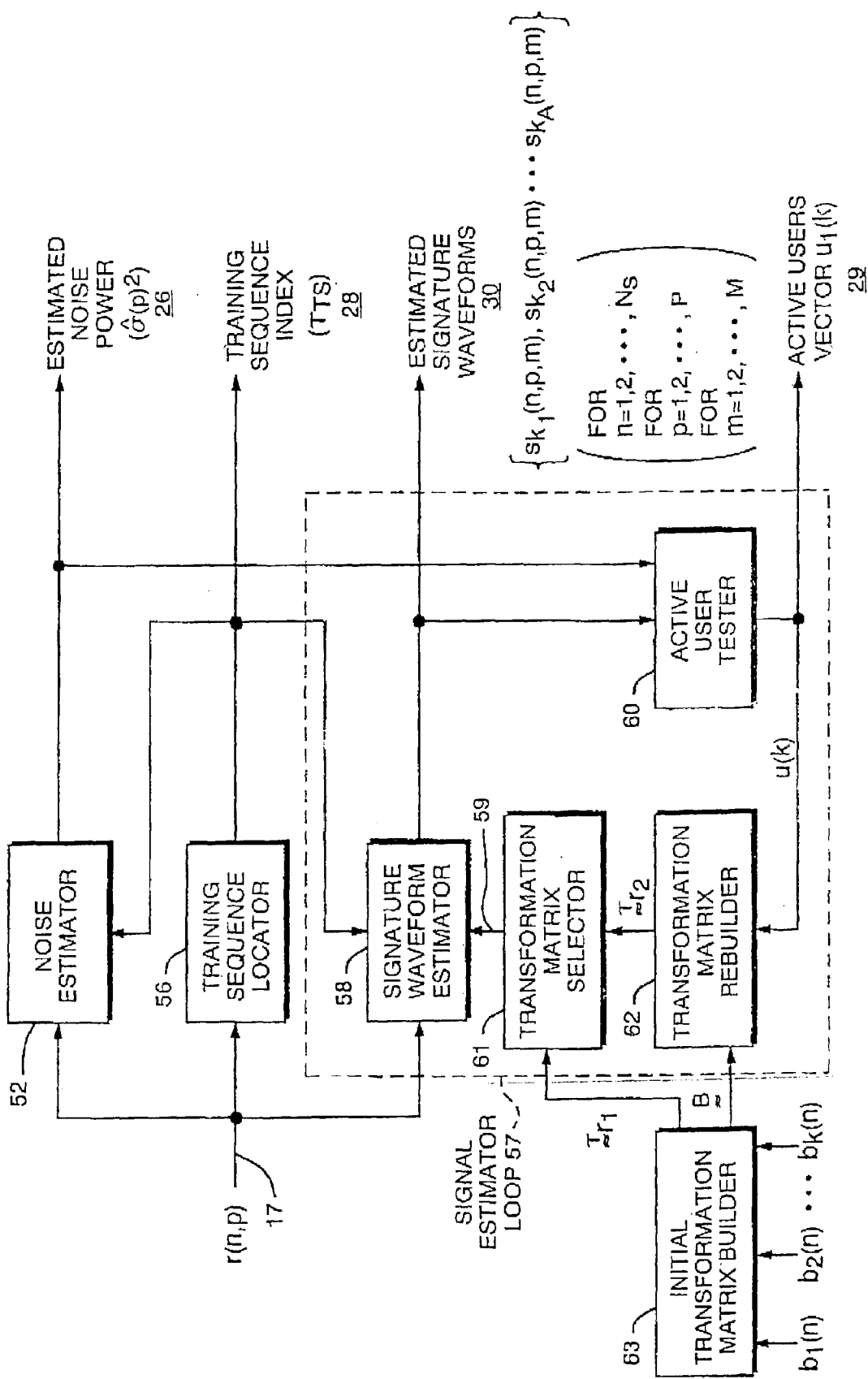
FIG. 5 is a block diagram of the Parameter Estimator configured in accordance with one embodiment of the present invention.

FIG. 5 is a block diagram of the Parameter Estimator configured in accordance with one embodiment of the present invention. Parameter Estimator 20 is shown comprising software modules which include a Training Sequence Locator 56, a Noise Estimator 52, a Signal Estimator Loop 57, and an Initial Transformation Matrix Builder 63. The Signal Estimator Loop 57 further includes a Signature Waveform Estimator 58, an Active Users Tester 60, a Transformation Matrix Selector 61, and a Transformation Matrix Rebuilder 62. Alternative embodiments and configurations may implement similar functionality.

The Training Sequence Locator 56 is used to estimate the location index, $\tau_{TS}$, in each frame of received data, $f_m(n,p)$, of the composite received training sequence, $\beta(n,p)$, and the Noise Estimator 52 is used to calculate an estimate of the average noise power ($\hat{\sigma}(p)^2$) in the received signal r(n,p) for each diversity port, p. The Signature Waveform Estimator 58 is used to estimate the characteristic signature waveforms, $\hat{s}_k(n, p, m)$, unique to each user K, and each diversity port p, for each frame m, in the received snapshot.

The output of the Signature Waveform Estimator 58 is fed to an Active Users Tester 60 which detects which users signals are present in the given snapshot, and provides an output to a Transformation Matrix Rebuilder 62 which rebuilds the Transformation Matrix ($\underline{T}_{r2}$) that is used in the Signature Waveform Estimator 58. This matrix is rebuilt by using only the training sequences, $b_k(n)$, of the active users as calculated by the Active Users Tester 60.

The output of the Transformation Matrix Rebuilder 62 is fed to a Transformation Matrix Selector 61 which selects the output $\underline{T}_{r1}$ from an Initial Transformation Matrix Builder 63 or the output $\underline{T}_{r2}$ from the Transformation Matrix Rebuilder 62 to send to the Signature Waveform Estimator 58. In this particular embodiment, the Transformation Matrix Selector 61 always selects $\underline{T}_{r1}$ for the initial estimate of the signature waveforms in the given snapshot, and always selects $\underline{T}_{r2}$ for all subsequent recalculations of the signature estimates for the same snapshot of data. This allows the Signature Waveform Estimator 58 to calculate a better estimate of the characteristic signature waveforms, $\hat{s}_{ka}(n, p, m)$, for only the active users as determined by the Active User Tester 60.

This process of performing the Signature Waveform Estimator 58, performing the Active User Tester 60, and running the Transformation Matrix Rebuilder 62, is referred to as the Signature Estimation Loop 57. The Signature Estimation Loop 57 can be repeated until the output of the Active User Tester 60 calculated on the previous iteration equals the output of the Active User Tester 60 on the current iteration. It is also possible to set the maximum number of Signature Estimators Loops 57 in the Parameter Estimation 20 component.

Note that with each iteration through this Loop 57, the number of signature waveforms at the output of the Signature Waveform Estimator 58 is equal to the number of active users calculated on the previous iteration. Further note that on the first iteration, the number of signature estimates is equal to the total number of possible users, K. Once the final signature estimates of the active users are calculated, the resulting waveforms are passed as outputs of the Parameter Estimator 20 along with the user states vector, u(k) that reports which users are active in the current snapshot.

The Initial Transformation Matrix Builder 63 receives known training sequence data, $b_k(n)$, for each user, which may be prestored, for example, in a Memory 19 of the Multiuser Detection Receiver 12. Each user's training sequence data is used to build the Initial Transformation Matrix, $\underline{T}_{r_1}$, which is fed to the Transformation Matrix Selector 61.

The Noise Estimator 52 estimates the noise power in the incoming signal, r(n,p) for all p=1,2, . . . P, diversity ports and feeds the information to the Active User Tester 60 and the MUD 18. This estimation is typically done once per snapshot wherein the snapshot is at least the number of samples in two frames, but need not be done as often if the noise power is changing slowly or not at all. Note that the accuracy of the Noise Estimator 52 improves as the number of composite training sequence estimates, $\hat{\beta}_m(n, p)$, increases. To increase the number of composite training sequence estimates, the number of frames, $f_m(n,p)$, in the received complex baseband signal, r(n,p), must increase. This results in an increased snapshot size. Alternatively, the Training Sequence Selector 56 must store the composite training sequence estimates, $\hat{\beta}_m(n, p)$, for multiple snapshots of received data, and calculate the estimated noise power using the total number of stored composite training sequence estimates $\hat{\beta}_m(n, p)$.

The Training Sequence Locator 56 determines the position of the training sequence in each frame, $f_m(n,p)$ of the received snapshot vector, r(n,p) and feeds this information in the form of a sample index, $\tau_{TS}$, referred to as the Training Sequence Location Index 28, to the MUD 18. In addition, the position of the training sequence in the received snapshot is fed to the Noise Estimator 52 and to the Signature Waveform Estimator 58 where it is used to determine which section of each frame, $f_m(n,p)$, in r(n,p) to process in order to determine the average noise power estimate, $\hat{\sigma}(p)^2$ and signature estimates $\hat{s}_k(n, p, m)$, respectively. The Signature Waveform Estimator 58 estimates the signature waveforms $\hat{s}_k(n, p, m)$ in each frame, m, of each K individual co-channel interfering signal in the composite received input signal, r(n,p), for each diversity port p, and outputs this information to the Active User Tester 60 and MUD 18.

FIG. 6 is a flow chart of a Training Sequence Locator component configured in accordance with one embodiment of the present invention. The Training Sequence Locator 56 component is configured to locate the training sequence in the received complex baseband signal, r(n,p), received from each diversity port, (p=1,2 . . . ,P), processing a minimum of two frames of received data. Because the number of samples in a transmitted frame of data (F) is known to the receiver, each received frame, $f_m(n,p)$, in r(n,p) repeats at the same time rate as a transmitted frame of data. Therefore, the location of the composite training sequence, β(n,p), will be the same for each frame, $f_m(n,p)$, of received data. However, because the transmitted and received frames of data are not initially synchronized, the beginning of a transmitted frame of data may not start at the beginning of a frame, $f_m(n,p)$, of received data. This means that the location of the training sequence in each frame of received data also may not start at the beginning of each frame.

The Training Sequence Locator 56 finds the location of the training sequence in each frame of received data. To do this, a sliding search window vector, $l_m(\tau,p)$, that is L samples long (the same length as the received composite training sequence) is applied simultaneously through each frame of received data, and the correlation between each combination of windowed frames is computed and then averaged in a Detection Statistic Calculator 90. The result is a detection statistic, $d_p(\tau)$, which is exactly the length of a frame of received data (F samples long). Because the payload data is uncorrelated from frame to frame, the detection statistic will have a very low value when the sliding search windows are over the payload data in each frame. On the other hand, the composite training sequence, β(n,p), is highly correlated from frame to frame. Therefore, the detection statistic will be very high when the sliding search windows are over the composite training sequence in each frame. Thus, the location $\tau_{\hat{\beta}}$, of the peak in the detection statistic, $d_p(\tau)$, will be the location of the training sequence in each frame sequence, $f_m(n,p)$.

The inputs to the Training Sequence Locator 56 component are complex baseband received signals, r(n,p), from each diversity port, (p=1,2, . . . P). An estimate of the training sequence location index, $\tau_p$, is calculated separately for each diversity port signal, r(n,p) by the Detection Statistic Calculator 90. The first step in estimating the training sequence location index, $\tau_p$, is to provide the received signal, r(n,p), to the Detection Statistic Calculator 90, for calculating the detection statistic, $d_p(\tau)$, using that received signal. As previously stated, each element of this detection statistic is generated by calculating the correlation coefficients, $\rho_{ij}(\tau,p)$, for each combination of sliding search windows for a given training sequence sample index, τ. Once each combination of correlation coefficients is calculated, they are averaged and output as the value of the detection statistic, $d_p(\tau)$, for the specified value of τ. The step by step calculations needed to perform this process in accordance with one embodiment of the present invention are as follows:

Step 1. Define the sliding search window, $l_m(\tau,p)$ for each frame of received data in the given signal, r(n,p), for the given search window sample index, τ.

$$l_m(\tau, p) = \begin{bmatrix} r(\tau + (m-1) \cdot F, p) \\ r(\tau + (m-1) \cdot F + 1, p) \\ \vdots \\ r(\tau + (m-1) \cdot F + (L-1), p) \end{bmatrix}, \forall m = 1, 2 \ldots, M \quad (3)$$

Step 2. Calculate the energy, $e_m(\tau,p)$, in each sliding search window, $l_m(\tau,p)$:

$$e_m(\tau,p) = l_m(\tau,p)^H \cdot l_m(\tau,p), \forall m=1,2,\ldots,M \quad (4)$$

Step 3. Calculate the correlation coefficient, $\rho_{ij}(\tau,p)$, for each combination of sliding search windows:

$$\rho_{i,j}(\tau, p) = \frac{\|l_i(\tau, p)^H \cdot l_j(\tau, p)\|}{\sqrt{e_i(\tau, p) \cdot e_j(\tau, p)}}, \quad (5)$$

$$\forall (i, j) = \begin{Bmatrix} (1,2), (1,3), \ldots (1, M), \\ (2,3), (2,4), \ldots (2, M), \\ \ldots, (M-1, M) \end{Bmatrix}$$

Step 4. Calculate the detection statistic, $d_p(\tau)$, for the given search window sample index, τ, for diversity port, p, by averaging the corresponding correlation coefficients:

$$d_p(\tau) = \frac{\sum_{i=1}^{M-1} \sum_{j=i+1}^{M} \rho_{i,j}(\tau, p)}{\sum_{i=1}^{M-1} i} \quad (6)$$

This process (steps 1–4) is repeated for each search window sample index, {τ=1,2, . . . ,F} and for each diversity port {p=1,2, . . . P}.

Still referring to FIG. 6, once the detection statistic, $d_p(\tau)$, for each diversity ports received signal, r(n,p), is calculated, it is fed to a Training Index Finder 92, where the estimated location, $\tau_p$, of the training sequence for each diversity port signal is calculated by finding the sliding search window index, τ, that maximizes the detection statistic. The Training Index Finder 92, calculates the following equation for each detection statistic, $d_p(\tau)$:

$$\tau_p = \arg\left\{\max_{\tau \in \{1,2,...F\}} (d_p(\tau))\right\}, \forall\, p = 1, 2, \ldots, P \qquad (7)$$

Next, a Confidence Metric Calculator 94, calculates a confidence metric from each detection statistic. This is done by calculating the peak to rms value of each detection statistic. This process can be implemented, for instance, by performing the following calculation for each detection statistic, $d_p(\tau)$.

$$c_p = \frac{\max(d_p(\tau))}{\text{rms}(d_p(\tau))}, \forall\, p = 1, 2, \ldots, P \qquad (8)$$

As previously stated, this entire detection process is applied to the received signal, r(n,p), of each diversity port, p, separately. Once the training sequence location, $\tau_p$, has been estimated and the confidence metric, $c_p$, has been computed for each signal, a decision test is applied to determine which estimate to use. Comparator 96 performs this decision test by comparing the values of each confidence metric and setting the output training sequence location, $\tau_{TS}$, equal to the estimated training sequence, $\tau_p$, that has the highest confidence metric, $c_p$. This process is described mathematically in the following equation:

$$\tau_{TS} = \tau_p \ni p = \arg\left\{\max_{p \in \{1,2,...,P\}} (c_p)\right\} \qquad (9)$$

Figure 7:
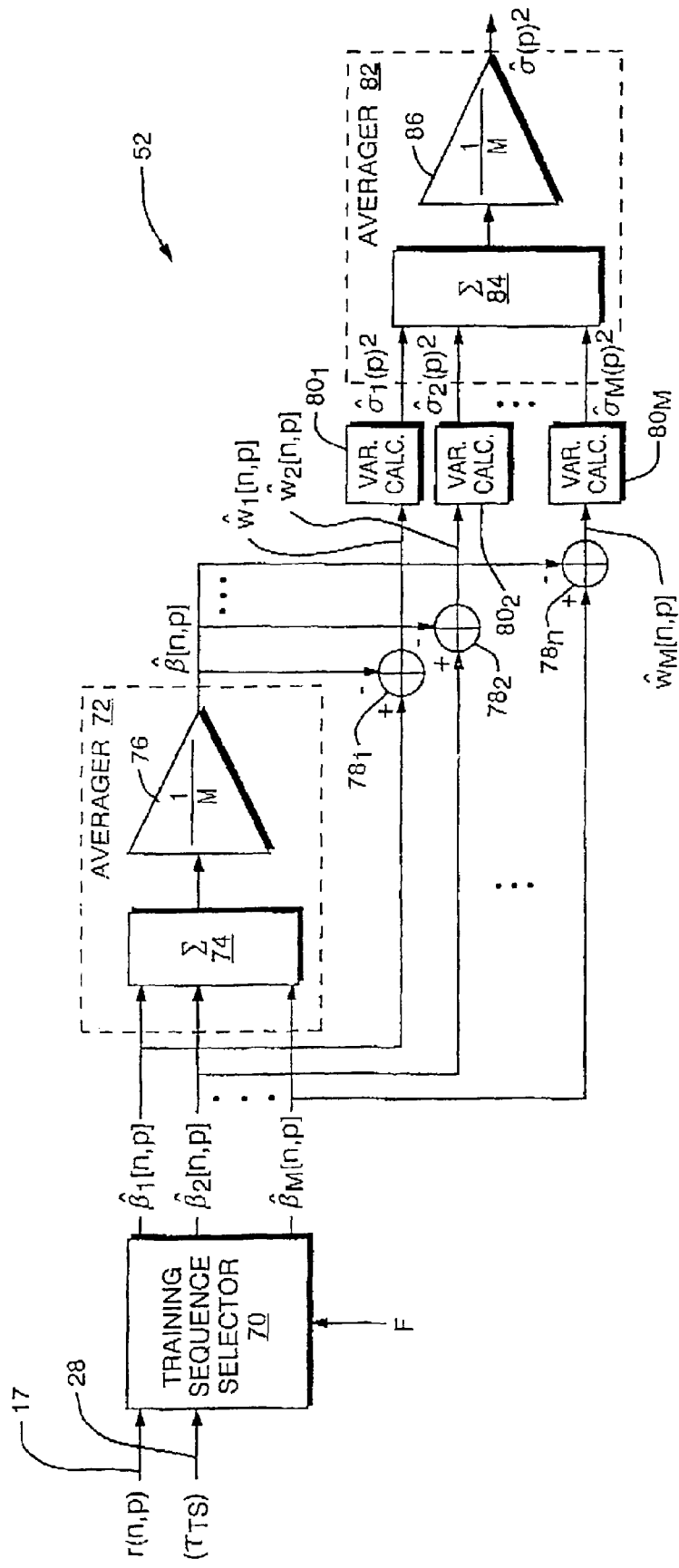
FIG. 7 is a block diagram of a Noise Estimator component configured in accordance with one embodiment of the present invention.

FIG. 7 is a block diagram of a Noise Estimator component configured in accordance with one embodiment of the present invention. The Noise Estimator 52 of the Parameter Estimator 20 calculates an accurate estimate of the average noise power in the received signal, r(n,p), from each diversity port p. Typically, the dominant noise source is the thermal noise generated by the first stage of low noise amplifiers (LNAs) in the Signal Sampler 14. This noise can be accurately modeled as complex zero mean additive white Gaussian noise (AWGN).

Because each diversity port p contains its own stage of LNAs, the noise power in the received signal, r(n,p), may be slightly different from port to port. Therefore, it is important to obtain a separate estimate of the noise power for each diversity port p. Because the noise is additive, the section in each frame of received data, r(n,p), which contains the composite training sequence, β(n,p), can be modeled as the composite training sequence plus additive white noise, $w_m(n,p)$. This noise is also considered to be statistically independent of the received data. As previously explained, the Training Sequence Locator 56 component determines the location index in each frame $f_m(n,p)$ of received data that contains the composite training sequences. This allows the Noise Estimator 52 to extract the section of each frame, which contains an estimate of the received composite training sequence $\hat{\beta}_m(n, p)$.

Training Sequence Selector 70 receives the complex baseband signal r(n,p) for diversity port p into a routine that outputs the sections of that signal corresponding to the received training sequence for each frame of received data. Training Sequence Selector 70 also receives the training sequence index, $\tau_{TS}$ 28 and the number of frames of data, M, captured in the received signal r(n,p) for use in selecting such outputs. M is calculated based on the size of the received signal r(n,p) and the known number of samples per frame, F.

The Training Sequence Selector 70 outputs, $\hat{\beta}_m(n, p)$ for (m=1,2, . . . M), which are fed to an Averager 72 that calculates the average value of each of the vectors, $\hat{\beta}_m(n, p)$ in order to get a good representation of the composite training sequences $\hat{\beta}(n, p)$. In this particular embodiment, the Averager 72 comprises a summing routine 74 and a 1/M multiplier 76.

The estimated signal, $\hat{\beta}(n, p)$, is subtracted from each vector, $\hat{\beta}_m(n, p)$, in summers $78_1, 78_2, \ldots 78_M$ to obtain an estimated noise signal, $\hat{w}_m(n, p)$, contained in each vector, $\hat{\beta}_m(n, p)$. Then each noise signal, $\hat{w}_1(n, p), \hat{w}_2(n, p), \ldots \hat{w}_M(n, p)$, is fed to a variance calculator $80_1, 80_2 \ldots 80_M$ where the variance of each noise signal is calculated to obtain an estimate of the average noise power, $\hat{\sigma}_m(p)^2$, in each frame, M. The average noise power, $\hat{\sigma}_m(p)^2$, in each frame is fed to an Averager 82 which determines an estimate of the average noise power, $\hat{\sigma}(p)^2$, in the received signal r(n,p) for diversity port p. If there is more than one diversity port, the above process is repeated to obtain a noise power estimate for the received signal, r(n,p) received by each diversity port (p=1, 2, . . . ,P).

An accurate estimate of the received composite training sequence, $\hat{\beta}(n, p)$, is used to obtain a noise power estimate for the received signal, r(n,p), from each diversity port, p, separately. The first step in estimating the noise power in the received signal, r(n,p), for diversity port, p, is for the Training Sequence Selector 70 to extract the estimated composite training sequences, $\hat{\beta}_m(n, p)$, in each frame of received data based on the training sequence location index ($\tau_{TS}$), the number of samples per frame (F), the number of samples in each received training sequence to process ($N_w$) and the offset into each received training sequence ($\delta_w$) to use. Note that both $N_w$ and $\delta_w$ are parameters that are stored in the memory of the Training Sequence Selector 70, and therefore can be modified to select any section of the received composite training sequences. These values would typically be set so that the central portion of each composite received training sequence is extracted from the received signal, r(n,p). The Training Sequence Selector 70 is described mathematically as follows:

$$\hat{\beta}_m(n, p) = r((n-1) + (m-1) \cdot F + \tau_{TS} + \delta_w, p), \qquad (10)$$
$$\forall\, n = 1, 2, \ldots, N_w$$
$$\forall\, m = 1, 2, \ldots, M$$

Once the estimated received training sequences, $\hat{\beta}_m(n, p)$, for each frame, m, of received data have been extracted from the received signal, r(n,p), they are all averaged with each other by the Averager 72 in order to minimize the affects of the noise vector, $w_m(n,p)$, added to each estimate of the received training sequence. This produces a more accurate estimate of the actual received training sequence, $\hat{\beta}(n, p)$. This process is expressed mathematically as follows:

$$\hat{\beta}_m(n, p) = \frac{1}{M} \sum_{m=1}^{M} \hat{\beta}_m(n, p), \forall n = 1, 2, \ldots, N_w \quad (11)$$

Once this is done, the estimated received training sequence, $\hat{\beta}(n, p)$, is subtracted from each vector, $\hat{\beta}_m(n, p)$, in order to obtain an estimate of the noise signal, $\hat{w}_m(n, p)$ contained in each.

Next, the variance of each noise signal is calculated by Variance Calculators $80_1$, to $80_M$ to obtain an estimate of the average noise power, $\hat{\sigma}_m(p)^2$, in each frame. This calculation is expressed as follows:

$$\hat{\sigma}_m(p)^2 = \frac{1}{N_w} \sum_{n=1}^{N_w} \|\hat{w}_m(n, p)\|^2, \forall m = 1, 2, \ldots, M \quad (12)$$

Each of these noise power estimates, $\hat{\sigma}_m(p)^2$, are then averaged in Averager 82 to obtain an estimate of the average noise power, $\hat{\sigma}(p)^2$ in the received signal, r(n,p). This averaging is performed mathematically as follows:

$$\hat{\sigma}(p)^2 = \frac{1}{M} \sum_{m=1}^{M} \hat{\sigma}_m(p)^2 \quad (13)$$

This entire process is repeated for each diversity port, p, in order to obtain a noise power estimate for each received signal, r(n,p).

Figure 8:
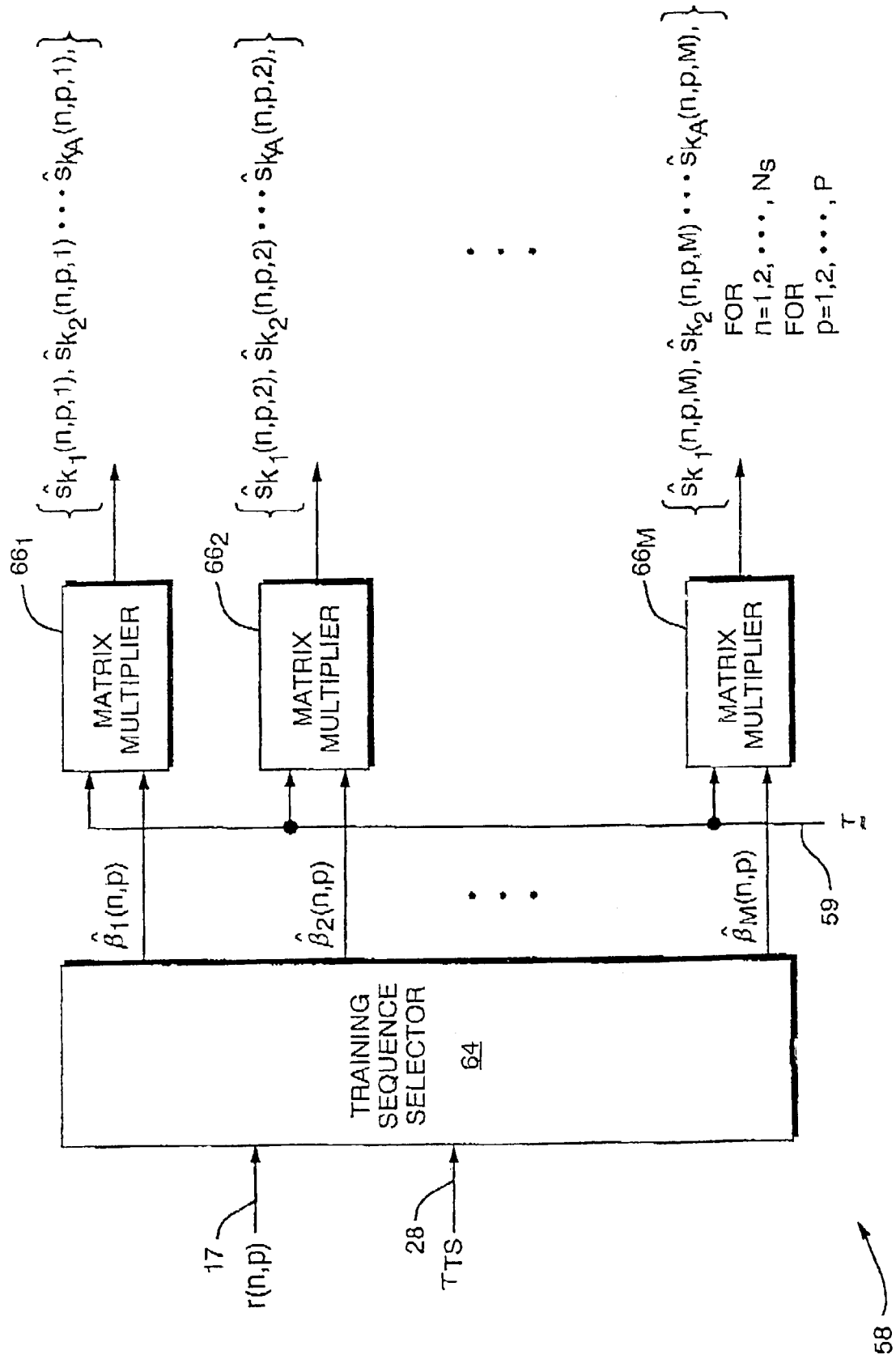
FIG. 8 is a flow chart of the Signature Waveform Estimator component configured in accordance with one embodiment of the present invention.

FIG. 8 is a flow chart of the Signature Waveform Estimator component configured in accordance with one embodiment of the present invention. Signature Waveform Estimator 58 component includes a Training Sequence Selector 64 which provides the received training sequence, $\hat{\beta}_m(n, p)$, for each frame m of received data, to Matrix Multiplier 66$_m$. The Signature Waveform Estimator 58 estimates the characteristic signature waveforms $\hat{s}_k(n, p, m)$ that transform each user's transmission signal as it propagates from transmitter to receiver, for each diversity port, p, and each frame, m, of received data. This transformation is expressed mathematically as follows:

$$r(n, p) = \sum_{k=1}^{K} d_k(n) * s_k(nT_n, p) + w(n, p) \quad (14)$$

This equation shows that the complex baseband signal received from diversity port (p) is the sum of each users transmission signal, $d_k(n)$, convolved (indicated by the asterisk) with a corresponding characteristic signature waveform, $s_k(nT_n,p)$, sampled at $T_n$ seconds per sample, that is unique to user, k, and diversity port, p, plus additive white noise, w(n,p). This expression can be rewritten in matrix form as follows:

$$\therefore \underset{(N\times1)}{r(p)} = \underset{(N\times KN_s)}{\underline{D}} \cdot \underset{(KN_s\times1)}{\underline{s}(p)} + \underset{(N\times1)}{\underline{w}(p)} \quad (15)$$

where:

$$\underset{(N\times N_s)}{\underline{D}_k} = \begin{bmatrix} d_k(1) & 0 & \cdots & 0 \\ d_k(2) & d_k(1) & \ddots & \vdots \\ \vdots & d_k(2) & \ddots & 0 \\ \vdots & \vdots & \ddots & d_k(1) \\ d_k(N_d) & \vdots & \ddots & d_k(2) \\ 0 & d_k(N_d) & \ddots & \vdots \\ \vdots & \ddots & \ddots & \vdots \\ 0 & \cdots & 0 & d_k(N_d) \end{bmatrix} ; \underset{(N_s\times1)}{\underline{s}_k(p)} = \begin{bmatrix} s_k(1, p) \\ s_k(2, p) \\ \vdots \\ s_k(N_s, p) \end{bmatrix} \quad (16)$$

$$\underset{(N\times KN_s)}{\underline{D}} = [\underline{D}_1, \underline{D}_2, \ldots \underline{D}_K] ; \underset{(KN_s\times1)}{\underline{s}(p)} = [\underline{s}_1(p)^T \ \underline{s}_2(p)^T \ \ldots \ \underline{s}_K(p)^T]^T \quad (17)$$

$$\underset{(N\times1)}{\underline{r}(p)} = [r(1, p) \ r(2, p) \ \ldots r(N, p)]^T ; \underset{(N\times1)}{\underline{w}(p)} = [w(1, p) \ w(2, p) \ \ldots w(N, p)]^T \quad (18)$$

For a given diversity port, p, the approach used to estimate these signature responses is to compare the section of the received signal that contains the composite training sequence, $\beta(n,p)$, with the actual known training sequences, $b_k(n)$, transmitted by each user, k=1,2, . . . K. This can be accomplished because the transmitted training sequences, $b_k(n)$, from each user are known by the Receiver 12 and because an estimate of the received composite training sequence, $\beta(n,p)$ can be extracted from the received signal, $r(n,p)$, using the Training Sequence Locator 56. In this case $$d_k(n)=b_k(n), \underline{\underline{D}}=\underline{\underline{B}}, r(n,p)=\beta(n,p), \text{ and } \underline{r}(p)=\underline{\beta}(p). \quad (19)$$

The maximum likelihood estimate of the characteristic signature waveforms $\hat{s}_k(n, p)$, for each user, k, and each diversity port, p, is the one that collectively minimize the square error between the received composite training sequence, $\beta(n,p)$, and the sum of each users training sequence convolved with its corresponding signature waveform $$\left(\sum_{k=1}^{K} b_k(n) * \hat{s}_k(n, p)\right).$$

This maximum likelihood estimate is expressed mathematically in matrix form as follows:

$$\underline{s}_{ML}(p) = \arg\min_{\underline{s} \in \Omega}\left\{\left\|\underline{\beta}(p) - \underline{\underline{B}} \cdot \underline{s}\right\|^2\right\} \quad (20)$$

where $\Omega$ equals the set of all possible combinations of $\underline{s}$.

Using the maximum likelihood approach, the signature estimates can be solved for by using a zero forcing criteria. This is done by setting the expression inside the minimization equal to zero as follows:

$$\|\underline{\beta}(p) - \underline{\underline{B}} \cdot \underline{s}_{ML}(p)\|^2 = 0 \quad (21)$$

Once this is done, the characteristic signature waveform vector can be calculated by solving the above set of linear equations for $\underline{s}_{ML}(p)$ as follows:

$$\underline{s}_{ML}(p) = ((\underline{\underline{B}}^H \underline{\underline{B}})^{-1} \underline{\underline{B}}^H) \underline{\beta}(p) \quad (22)$$

Based on the solution of the maximum likelihood equation above, the first step is for Training Sequence Selector 64 in the Signature Waveform Estimator 58 to extract the portion of the received signal, $r(n,p)$, for each frame, m, that contains the received composite training sequence, $\hat{\beta}_m(n, p)$, in that frame. This is done in the Training Sequence Selector (step 64) and is based on the location of the training sequence, $\tau_{TS}$, the number of samples per frame, F, the number of samples of the received training sequence to select, $N_\beta$, and the offset into each received training sequence, $\delta_\beta$, to use.

Note that $N_\beta$ is equal to $(N_s+N_b-1)$, where $N_s$ is the number of samples to use for each signature estimate, and $N_b$ is the number of samples to in the known training sequences. Further note that $N_s$ and $\delta_\beta$ are parameters that are stored in the memory of this Training Sequence Selector 64 and therefore can be modified to select any section of the received composite training sequences in each frame. These values would typically be set so that the entire composite received training sequence is extracted from the received signal, $r(n,p)$. The Training Sequence Selector step 64 is described mathematically as follows:

$$\hat{\beta}_m(n, p) = r((n-1) + (m-1) \cdot F + \tau_{TS} + \delta_\beta, p)), \begin{array}{l} \forall n = 1, 2, \ldots, N_\beta \\ \forall m = 1, 2, \ldots, M \end{array} \quad (23)$$

The next step 66$_1$ to 66$_M$ in estimating the signature waveforms is to multiply the transformation matrix $\underline{\underline{T}}_r$, received from the Transformation Matrix Selector 61, with the section of the received complex baseband signal that contains the composite received training sequence estimate, $\hat{\beta}_m(n, p)$, for each frame, m, where m=1,2, ... M, using the Matrix Multiplier step 66$_1$ to 66$_M$ as follows:

$$\underline{\hat{\beta}}_m(p) = [\hat{\beta}_m(1,p)\hat{\beta}_m(2,p) \ldots \hat{\beta}_m(N_\beta, p)]^T,$$
$$\forall m=1,2, \ldots M \quad (24)$$

$$\underline{\hat{s}}(p, m) = \underline{\underline{T}}_r \cdot \underline{\hat{\beta}}_m(p), \forall m=1,2, \ldots M \quad (25)$$

where:

$$\hat{s}(p, m) = \begin{bmatrix} \hat{s}_{k_1}(p, m) \\ \hat{s}_{k_2}(p, m) \\ \vdots \\ \hat{s}_{k_A}(p, m) \end{bmatrix}; \hat{s}_{k_a}(p, m) = \begin{bmatrix} \hat{s}_{k_a}(1, p, m) \\ \hat{s}_{k_a}(2, p, m) \\ \vdots \\ \hat{s}_{k_a}(N_s, p, m) \end{bmatrix} \quad (26)$$

Note that A equals the total number of active users, and $k_a$ equals the index of the $a^{th}$ active user. Therefore, for the first iteration through the signature estimation loop, $k_a$=k and A=K for k-1,2, ... K because for the first iteration, it is assumed that all K users are active.

On the initial calculation of the signature waveform estimates the transformation matrix, $\underline{\underline{T}}_r$, is passed into the Signature Waveform Estimator 58 from the Initial Transformation Matrix Builder 63 by way of the Transformation Matrix Selector 61 routine. On all subsequent estimates of the signature waveforms for the given complex baseband received signal, $r(n,p)$, the Transformation matrix $\underline{\underline{T}}_r$ is passed to the Signature Waveform Estimator 58 from the Transformation matrix Rebuilder 62 by way of the Transformation Matrix Selector routine 61. This is done so that only signature estimates of the Active users ($k_a$) are calculated. Note that the dimensions of the Transformation Matrix $\underline{\underline{T}}_r$ are a function of the number of samples ($N_s$) in each characteristic signature estimate, $\hat{s}_{k_a}(n, p, m)$, the estimated number of currently active users (A), and the number of samples ($N_\beta$) in each received composite training sequence estimate ($\hat{\beta}_m(n, p)$).

Figure 9:
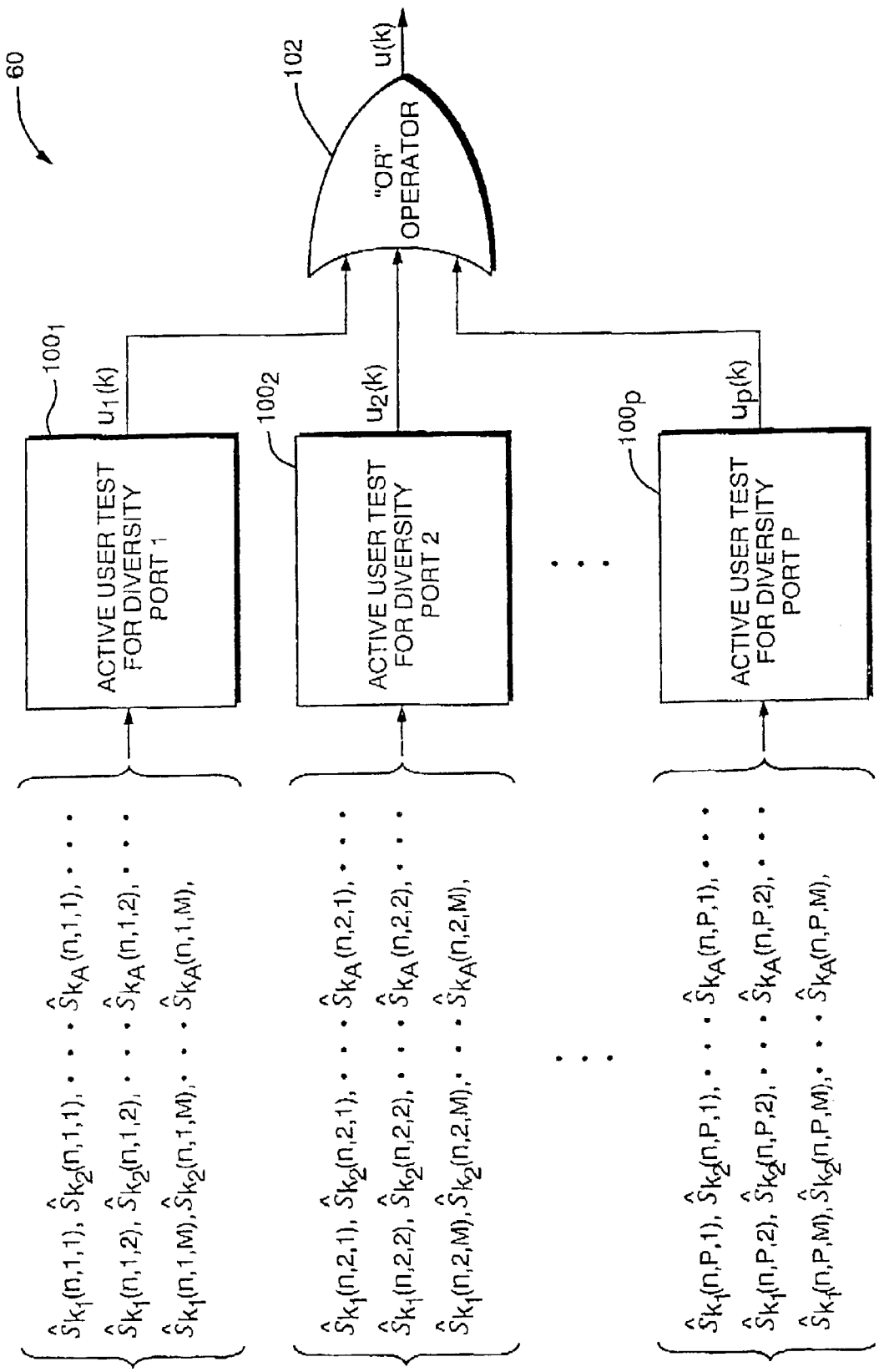
FIG. 9 is a flow chart for an Active User Tester component configured in accordance with one embodiment of the present invention.

FIG. 9 is a flow chart for an Active User Tester component configured in accordance with one embodiment of the present invention. The purpose of the Active User Test is to determine which users are transmitting information in each snapshot of received data, $r(n,p)$. This test is performed once for each iteration of the signature estimation loop. This is done by calculating the average received power in users signal based on the signature estimates, $\hat{s}_{k_a}(n, p, m)$, for each user, $k_a$, in each frame of received data, m, across each diversity port, p. These power estimates, $\hat{P}_{k_a}(p, m)$, are averaged across each frame, m, and the result, $\hat{P}_{k_a}(p)$, is compared to a predefined threshold, $r_{th}$, that is set relative to the estimated noise floor, $\hat{\sigma}(p)^2$.

To perform the Active User Test, the signature estimates, $\hat{s}_{k_a}(n, p, m)$, are processed for each diversity port, p, separately by a step 100 p referred to as the Active User Test For Diversity Port "p". The output of this step is a sequence, $u_p(k)$, of ones and zeros that is (K) elements long. If $u_p(k)=0$, then user k is estimated to be "inactive" and if $u_p(k)=1$, then user k is estimated to be "actively transmitting" based on the signature estimates for diversity port p. This output sequence, $u_p(k)$, is referred to as the active user test results sequence for diversity port p.

Once this test result sequence is calculated for each diversity port, the sequences are passed to a logical "OR" Operator 102. This logical "OR" function sets the combined active user test result sequence, $u(k)$, equal to 1 if any of the P $u_p(k)$ sequences are equal to 1 for each value of k, where $k=\{1,2,\ldots K\}$. Therefore, the combined active user test result sequence $u(k)$ equals 1 if any of the $u_p(k)$ sequences equal 1, and $u(k)$ equals 0 otherwise, for each user $k=1, 2, \ldots K$.

Figure 10:
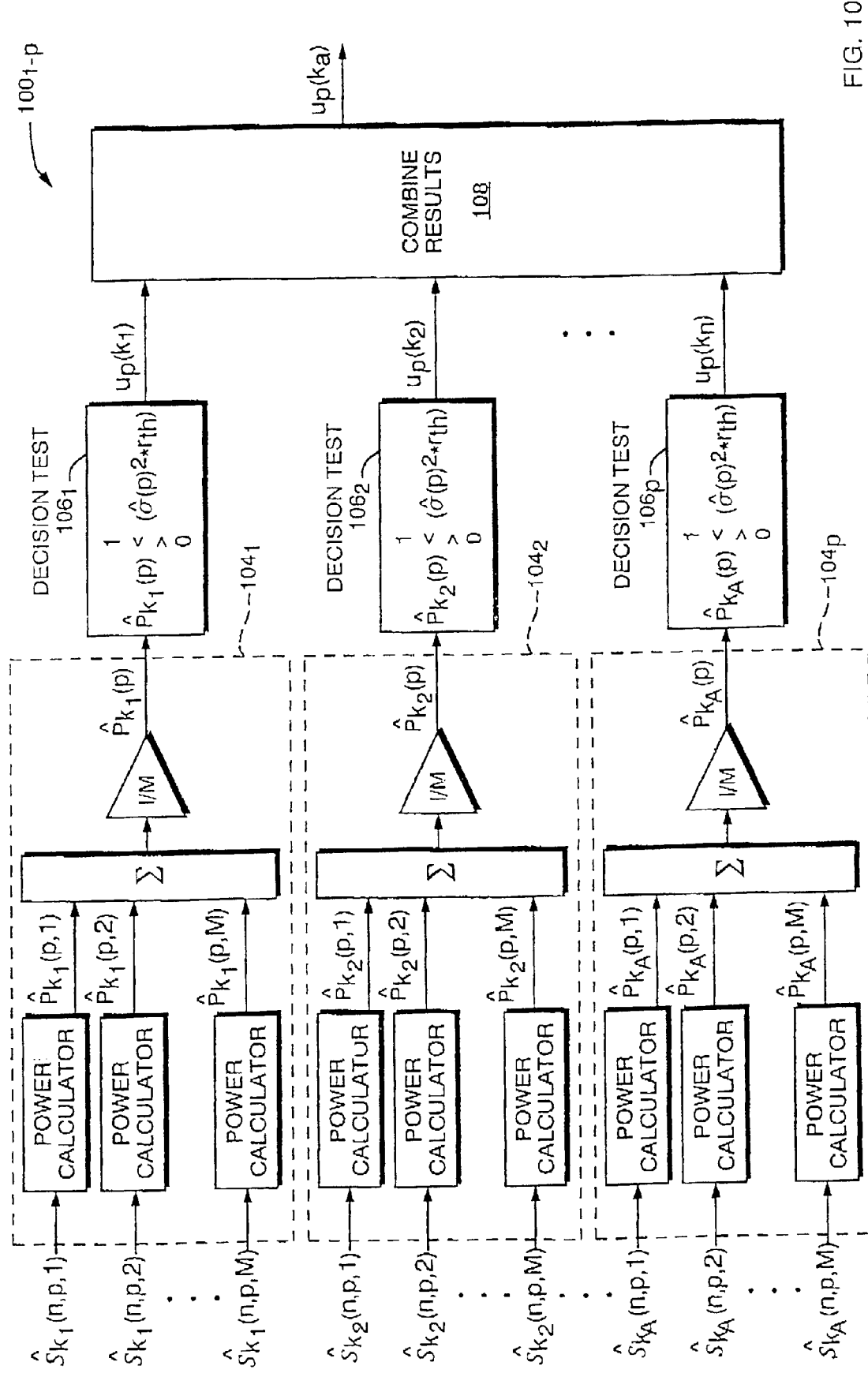
FIG. 10 is a flow chart for an Active User Test For Diversity Port "p" in accordance with one embodiment of the present invention.

FIG. 10 is a flow chart for an Active User Test For Diversity Port "p" in accordance with one embodiment of the present invention. For a given diversity port, p, the active user test result, $u_p(k_a)$, is calculated for the given user $k_a$, which was calculated to be active in the previous iteration of the signature estimation loop, by performing the following process:

The first step 104₁ to 104_p is to estimate the average received signal power for each user ($k_a$) using the estimated characteristic signature response, $\hat{s}_{k_a}(n, p, m)$, for each frame, m, and each user, $k_a$, where $k_a = k_1, k_2, \ldots k_A$ as shown in FIG. 10, and it is calculated as follows:

$$\hat{P}_{k_a}(p, m) = \frac{1}{F_{sym}} \sum_{n=1}^{N_s} \|\hat{s}_{k_a}(n, p, m)\|^2, \quad \begin{array}{l} \forall k_a = k_1, k_2, \ldots, k_A \\ \forall m = 1, 2, \ldots, M \end{array} \quad (27)$$

where $F_{sym}$ equals the number of samples per symbol.

Once the signal powers, $\hat{P}_{k_a}(p, m)$, are estimated for each user, $k_a$, the results from each frame are averaged as follows:

$$\hat{P}_{k_a}(p) = \frac{1}{M} \sum_{m=1}^{M} \hat{P}_{k_a}(p, m), \forall k_a = k_1, k_2, \ldots, k_A \quad (28)$$

In the next step 106₁ to 106_p, these estimated signature powers for each user ($k_a = k_1, k_2, \ldots, k_A$) are compared to a detection threshold, $r_{th}$, relative to the estimated noise floor, $\hat{\sigma}(p)^2$. If the estimated signature power, $\hat{P}_{k_a}(p)$, for user $k_a$ is greater than or equal to the product of the relative threshold, $r_{th}$, with the estimated noise floor, $\hat{\sigma}(p)^2$, then the active user test result, $u_p(k_a)$, for that user $k_a$ is set to 1. Otherwise, it is set to 0. This test is expressed mathematically as follows:

$$u_p(k_a) = \begin{cases} 1 & \hat{P}_{k_a}(p) \geq (\hat{\sigma}(p)^2 \cdot r_{th}) \\ 0 & \text{otherwise} \end{cases}, \forall k_a = k_1, k_2, \ldots, k_A \quad (29)$$

In Combine Results step 108, all of the results for $u_p(k_a)$ are then combined with the original user states vector, $u_p(k)$ as follows:

$$u_p(k) = \begin{cases} u_p(k_a) & k = k_a \\ 0 & \text{otherwise} \end{cases}, \forall k = 1, 2, \ldots, K \quad (30)$$

Referring to FIG. 5, the Transformation Matrix Rebuilder 62 uses the results of the Active User Tester 60 to rebuild the transformation matrix, $\underline{T}_r$, which is used by the Signature Waveform Estimator 58 to estimate the signature responses for each user, k, diversity port, p, and frame, m. This transformation matrix is rebuilt by removing the sub matrices, $\underline{B}_k$, in the training sequence matrix, $\underline{B}$, that correspond to the inactive users. This is done to create an updated transformation matrix, $\underline{T}_{r2}$, that is used to only estimate the signature responses of the active users, $k_a$. This process is represented mathematically as follows:

$$\tilde{\underline{B}} = [\tilde{\underline{B}}_{k_1}, \tilde{\underline{B}}_{k_2}, \ldots \tilde{\underline{B}}_{k_A}] \quad (31)$$

$$\therefore \underline{T}_{r2} = (\tilde{\underline{B}}^H \tilde{\underline{B}})^{-1} \tilde{\underline{B}}^H \quad (32)$$

Where $k_a$ can be defined using the following algorithm:

```
a = 1;
for k = 1:K
    if(u(k) = 1)
        k_a = k
        a = a+1
    end
end
```

The updated transformation matrix, $\underline{T}_{r2}$, is passed to the Signature Waveform Estimator 58 by way of the Transformation Matrix Selector 61. Inside the Signature Waveform Estimator 58, the updated transformation matrix, $\underline{T}_{r2}$, is reapplied to each estimated received training sequence, $\hat{\beta}_m(n, p)$, for each diversity port, p, and for each frame, m, in order to calculate more accurate signature waveform estimates for only the active users.

The Initial Transformation Matrix Builder 63 calculates the initial transformation matrix $\underline{T}_{r1}$, based on the known training sequences ($b_k(n)$), which are $N_b$ samples long, for each possible user (k=1,2, ... K). This transformation matrix is calculated as follows:

First, the known training sequence convolution matrix ($\underline{B}$) is determined:

$$\underset{((N_b+N_s-1) \times N_s)}{\underline{B}_k} = \begin{bmatrix} b_k(1) & 0 & \cdots & 0 \\ b_k(2) & b_k(1) & \ddots & \vdots \\ \vdots & b_k(2) & \ddots & 0 \\ \vdots & \vdots & \ddots & b_k(1) \\ b_k(N_b) & \vdots & \ddots & b_k(2) \\ 0 & b_k(N_b) & \ddots & \vdots \\ \vdots & \ddots & \ddots & \vdots \\ 0 & \cdots & 0 & b_k(N_b) \end{bmatrix} \quad (33)$$

$$\underset{((N_b+N_s-1) \times KN_s)}{\underline{B}} = [\underline{B}_1, \underline{B}_2, \ldots \underline{B}_K] \quad (34)$$

Second, the transformation matrix ($\underline{T}_{r1}$) is calculated as follows:

$$\underline{T}_{rI}^{(KN_sx(N_b+N_s-1))} = \left(\underline{B}^H \underline{B}\right)^{-1} \underline{B}^H \quad (35)$$

The Initial Transformation Matrix ($\underline{T}_{rI}$), is passed to the Signature Waveform Estimator 58 by way of the Transformation Matrix Selector 61, and is used to calculate the initial signature waveform estimates, $\hat{s}_k(n, p, m)$, for each possible user, k, across each diversity port, p, and each frame, m, of received data. Also, the known training sequence convolution matrix is passed to the Transformation Matrix Rebuilder 62 so that the sub matrices ($\underline{B}_1, \underline{B}_2 \ldots \underline{B}_k$) do not need to be regenerated for each iteration of the signature estimation loop.

The Transformation Matrix Selector 61 component is used to select which transformation matrix will be passed to the Signature Waveform Estimator 58. For a given snapshot of the complex baseband received signal, r(n,p), the initial signature waveform estimates, $\hat{s}_k(n, p, m)$, are calculated using the initial transformation matrix, $\underline{T}_{rI}$. Therefore, in this case, the Transformation Matrix Selector passes $\underline{T}_{rI}$ to the Signature Waveform Estimator 58 by setting its output, $\underline{T}_r$, equal to $\underline{T}_{rI}$. Once the Signature Waveform Estimator 58 estimates the signature waveforms for each user, the results are passed to the Active User Tester 60 to determine which users are currently active. These results are then passed to the Transformation Matrix Rebuilder 62 to rebuild the transformation matrix using only the known training sequence convolution matrices ($\underline{B}_{k_a}$) for the active users. Therefore, after the initial signature waveform estimates have been calculated, the Transformation Matrix Selector 61 passes the rebuilt transformation matrix, $\underline{T}_{r2}$, to the Signature Waveform Estimator 58 by setting its output, $\underline{T}_r$, equal to $\underline{T}_{r2}$.

Low Complexity MUD Algorithms

Conventional Minimum Mean Squared Error (MMSE) multiuser detectors with prior information typically show up in a turbo setting. Algebraic means are used to compute linear operators for the entire set of users (communications channels) simultaneously. This is done by utilizing prior information, or knowledge of the likely value of each user's bit of information, each at a particular instant in time. Such conventional multiuser detectors, however, were not designed for overloaded communication systems, and are subject to numerical instability, as well as unreasonable computational complexity.

Using the principles of the present invention, the instability problem of conventional detectors is solved. This solution can work with many varieties of multiuser detectors currently available or emerging, and dramatically reduces the number of computations needed in the multiuser detector block of a Turbo detector, so that reliable operation can be achieved in a real-time implementation. In one embodiment, the MUD module employs partial quantization of probability data in a MMSE detector. MMSE detection and hybrid cancellation are enabled in the same multiuser detection block, as well as variable size matrix operations in the turbo detector.

An example embodiment of a low complexity MUD with partially quantized prior information is discussed in reference to FIGS. 11–15C. Another example embodiment of a low complexity MUD based on prewhitened data is discussed in reference to FIGS. 16–23.

Low Complexity MUD with Partially Quantized Prior Information

Figure 11:
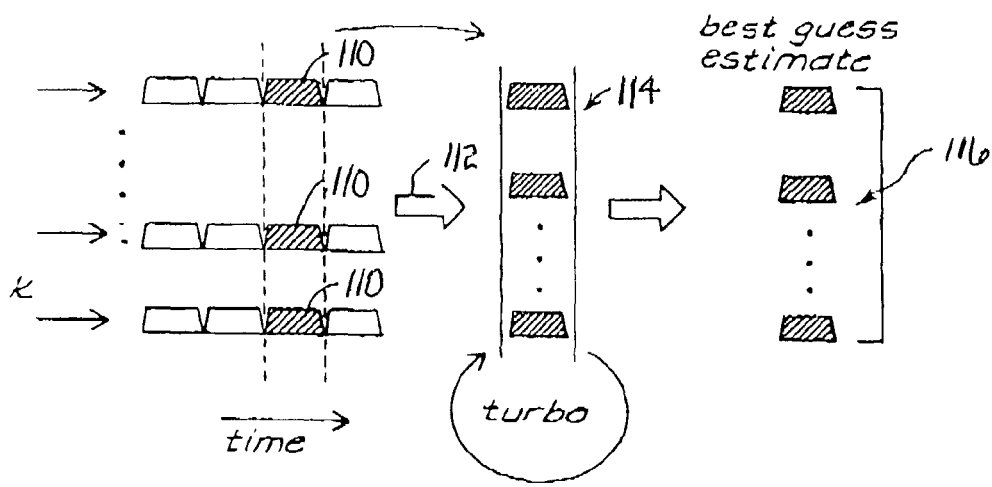
FIG. 11 is a diagrammatic representation of iterative processing of incoming data streams in a Turbo MUD in accordance with one embodiment of the present invention.

FIG. 11 is a diagrammatic representation of iterative processing of incoming data streams in a Turbo MUD in accordance with one embodiment of the present invention. Each stream corresponds to a different user. Any one stream may, for instance, be from multiple CDMA cellphones which are operating on the same frequency and transmitting at the same time, and which produce interfering signals. A stream may also be from a number of cable boxes communicating with a head end system, again on the same frequency and at the same time. Alternatively, a stream may be from multiple users of an 802.11 wireless local area network, or an ultra wideband network. Alternatively, a stream may be interfering signals from adjacent tracks on a digital storage disk in which the read head is overlapping one or more of the highly dense tracks. Regardless, what occurs is that a number of packets or chunks of data here illustrated at 110 are transmitted simultaneously, with each packet containing, for instance, several hundred bits.

In order to separate out the interfering signals, the incoming signals are applied as illustrated by arrow 112 to a Turbo MUD 114 which processes the incoming signals on a time interval by time interval basis, and provides best guesses or estimates of the individual bits for each user, as illustrated at 116. These best guesses or estimates are then applied in a feedback loop to the MUD so as to increase the likelihood that the particular bit is what it is supposed to be. This is done in an iterative process until such time as the error rate is statistically known to drop below a predetermined value. When it does, the bits corresponding to the digital incoming streams are outputted such that the incoming data is recovered with the interfering signals having been separated by the Turbo MUD 114.

Figure 12:
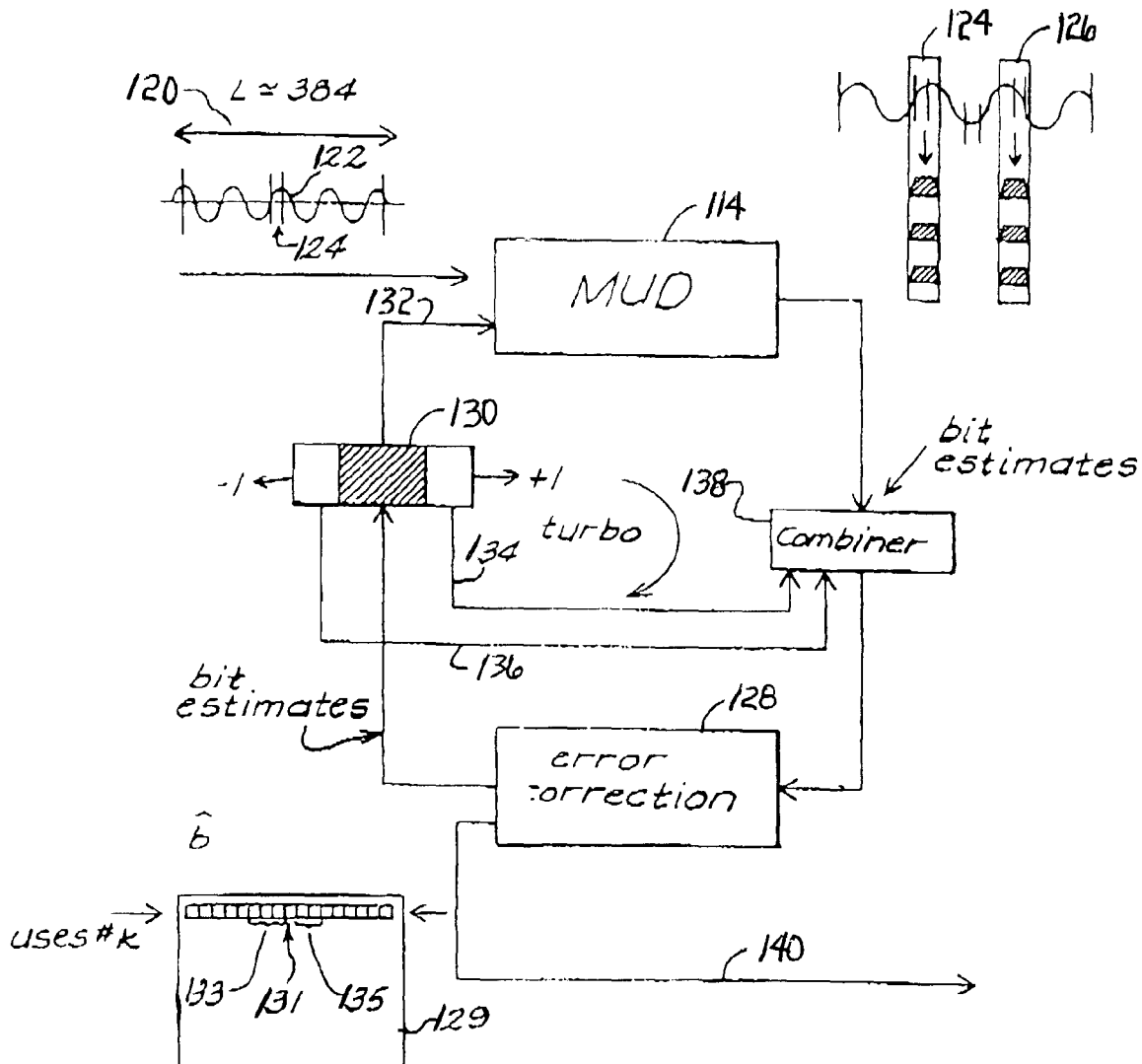
FIG. 12 is a block diagram illustrating a Turbo MUD system configured in accordance with one embodiment of the present invention.

FIG. 12 is a block diagram illustrating a Turbo Multiuser Detector configured in accordance with one embodiment of the present invention. This embodiment could be used, for example, to implement the Multiuser Detector 18 of FIGS. 1–3. Here, soft outputs from a MUD module are coupled back through an error corrector, with the best estimate averages being thresholded such that those estimates having a particular degree of certainty are ascertained and are not passed through in the feedback loop back to the MUD. Rather, those estimates are utilized in a combiner, with the processing by the MUD being substantially reduced by ignoring those bits of relative certainty.

In more detail, MUD 114 is adapted to process independent bits in the bit stream where L is used to indicate that there are, for example, several hundred bits during the L time interval. The L time interval is illustrated at 120 to delineate a portion of an incoming data stream of interfering signals illustrated by waveform 122. The MUD 114 considers only a bit-size portion of these incoming signals at a time, here illustrated by 124, and processes these signals so as to produce a number of best estimates of the bits from each of the users at that time instant. Here, the best estimates for a first user are illustrated in column 124 and for a second user in column 126.

These estimates in terms of real numbers called "soft" MUD outputs are coupled to an Error Correction Unit 128 which performs error correction functions such that as illustrated at 129 which determines the likelihood that a bit is either 1 or 0 in one embodiment based on a window of preceding and succeeding bits for each user. Thus, a bit 131 is determined by the bits in the preceding window 133 and the succeeding window 135. The output of the Error Correction Unit is applied back to MUD 114 so as to permit iterative processing of the bits for increasing the likelihood that a particular bit is what it is said to be.

This iterative processing is what takes an inordinate amount of time even under the best of circumstances due to the enormous number of possibilities for each of the bits from each of the users. One embodiment of the present invention eliminates from consideration during the next iteration of the MUD those bits that are determined to be almost certain.

Assume, for example, that out of 10 bits three are certain, then the processing by the MUD on the next iteration can be reduced to 12% of what the processing was during the last iteration. In order to do this, a Thresholding Module 130 eliminates from being passed back to the MUD 114 those bits that are determined to be certain enough so that they can be assigned either −1 or +1 in one embodiment. This Thresholding Module 130 passes through the relatively uncertain bit estimates on line 132 and passes through the relatively certain bit estimates as their quantized values, +1 or −1, on lines 134 and 136 to a Combining Unit 138, which combines these certain bits with the recomputed best guesses from MUD 114 on the next iteration.

The result is that the information provided to Error Correction Module 128 on the next iteration takes into account the certain bits and also the recomputed best guesses for the remainder of the bits. The Error Correction Unit 128 processes these combined estimates. The output of the Error Correction Unit 128 is again fed back to MUD 114 through Thresholding Unit 130, such that on this next pass, even more bits can be declared certain, with the following iteration only considering the leftover uncertain bit estimates, again resulting in a dramatic processing advantage on this subsequent iteration. When the output of the Error Correction Unit 128 is predicted to have an error rate less than a predetermined figure, then the iteration stops and the output is available on line 140 as the separated and demodulated signals.

FIG. 13 is a diagrammatic illustration of example thresholding performed by the system of FIG. 12. In this particular example, bits that lie between −1 and −0.95 are assigned the −1 value, whereas bits lying between 0.95 and +1 are given a +1 value. The Thresholding Unit 30 determines those bit estimates, for instance, between −1 and −0.95 probability of being correct and between +0.95 and +1 probability of being correct, respectively returning a −1 and +1, while the estimates of the other bits are passed through as illustrated by arrow 132. As can be seen, the thresholding is such that only those bit estimates which exist to either side of the thresholds as illustrated at 144 and 146 are those "certain" bits that are directly coupled to Combiner 138, whereas the remaining bit estimates are those that are passed through to MUD 114.

FIG. 14 is a block diagram illustrating example thresholding and combining performed by the system of FIG. 12. As can be seen, given a K by L matrix, thresholding in accordance with an embodiment of the present invention results in a processing advantage for the MUD 114. A predetermined subset 150 of the K×L matrix reflects a limited number of users and a limited number of bits.

FIG. 15A is a schematic diagram of two of the bits in an example K by L matrix of FIG. 14 having certain values. As can be seen, this subset includes three users, $k_1$, $k_2$ and $k_3$ and three time intervals, $l_1$, $l_2$ and $l_3$. Assume that due to the thresholding action of Thresholding Unit 130, the $k_3 l_1$ bit (designated 152) and the $k_2 l_3$ bit (designated 154) are deemed certain. On the next iteration by MUD 114, the bit estimates which remain uncertain are processed by MUD 114, whereas bit estimates which have now been quantized and are not further processed by the MUD 114 (i.e., unprocessed) are passed through.

This processing of the values from the matrix is shown more clearly in FIG. 15B, which shows the MUD 114 processes seven of the best estimate values (designated as 160) in the feedback loop. The two certain values (designated as 162) are passed through. FIG. 15C is a diagrammatic illustration of MUD signals which are processed on a next iteration combined with unprocessed signals so as to provide the error correction unit 130 with appropriate estimates.

The processed and unprocessed bits are thereafter combined at 138 such that the result that is coupled to the Error Corrector 128 is as illustrated at 164. As will be appreciated, after the thresholding, that which was passed through on the next iteration to Error Corrector 128 are new best estimates of what the bits should be, along with the certain bits. This enables the Error Corrector 128 to better process the output from Combiner 138 and to provide better estimates back through the Thresholding Circuit 130 to MUD 114. The result is that the final bit estimates are more quickly ascertained, which results in dramatically reduced processing times. Thus, the original incoming interfering signals are recovered quicker with fewer iterations and less computation.

Quantized Turbo MUD

The mathematical background underpinning the Low Complexity Mud with Partially Quantized Prior Information algorithm is now described. It is well known in the literature that the MUD processing block of a Turbo MUD processor reaches its ultimate performance when it directly maximizes the likelihood function:

$$\hat{b} = \underset{b}{\operatorname{argmax}}\{\Lambda'(b)\} = \underset{b}{\operatorname{argmax}}\{2 * \operatorname{Re}\{b' AS' r\} - b' S' S b + 2\sigma^2 \ln\{p_b(b)\}\} \quad (36)$$

The two parts of this likelihood are due to the fitting of the data to the candidate bits (first term), and a likelihood contribution due to any prior knowledge of what the bits were (second term). In turbo MUD, these prior likelihoods start out as unknown (0 or 1 equally likely), and subsequently as the loop iterates are simply the likelihoods from the last iteration. It is typical to assume that the likelihood contributions in the second term are mutually independent, which allows it to be rewritten:

$$2\sigma^2 \sum_{i=1}^{K} \ln(p_b(b_i)). \quad (37)$$

In the Low Complexity Mud with Partially Quantized Prior Information, Equation 36 is approximately solved by quantizing the second likelihood contribution to its extreme values. In fact, if a bit's prior likelihood is completely unknown, the probability of it being a 1 or a 0 are equal (does not influence Equation 36), and if the prior likelihood is perfectly known, the probability is 1 for the correct choice, and 0 for the incorrect choice. This forces a contribution to Equation 36 of $-\infty$ for the unlikely or incorrect guess of that bit.

This simplification or quantization of the likelihood function Equation 36 mathematically implies that the bit decisions at that point in the turbo iteration can be separated into two parts $S=[S_1 \ S_2]$, $b'=\lfloor b_1{}' \ b_2{}' \rfloor$, 'known' and 'unknown'. This simplifies the likelihood to:

$$\Lambda'(b) \rightarrow \Lambda'_{s_2}(b_2) = 2*Re\{b_2{}^h S_2{}^h (r-S_1 b_1)\} - b_2{}^h S_2{}^h S_2 b_2 \quad (38)$$

where it is understood that an optimization will only be conducted over the unknown bits (subscripted by 2), and the known bits (subscripted by 1) will be passed into the computation as inputs. Furthermore, the likelihood equation, and therefore processing implied by Equation 38 for the unknown bits is equivalent to normal MUD processing, replacing the data with the modified data $r-S_1 b_1$.

In this embodiment, a MMSE MUD algorithm is used to compute equation 38, although any number of MUD algorithms could be substituted. The MMSE operator will be $b_{out,2} = (\sigma^2 + A_2 S_2{}^H S_2 A_2)^{-1} (S_2 A_2)^H (r-S_1 A_1 b_{in,1})$, and can be computed using the algorithmic steps:

1) input $\tilde{b}_{in}$, threshold and register known and unknown bits;
2) input r,SA, and compute residual $\tilde{r} = r - S_1 A_1 b_{in,1}$;
3) compute $A_2 R_2 A_2 = A_2 S_2{}^H S_2 A_2$;
4) compute $(\sigma^2 I + A_2 R_2 A_2)^{-1}$;
5) compute $\tilde{b}_{out,2} = (\sigma^2 I + A_2 R_2 A_2)^{-1} (S_2 A_2)^H \tilde{r}$; and
6) pass through $\tilde{b}_{out,1} = \tilde{b}_{in,1}$.

The Low Complexity Mud with Partially Quantized Prior Information algorithm can be carried out, for example, by the embodiment illustrated in FIG. 12.

Low Complexity M-Algorithm Based on Prewhitened Data

Figure 16:
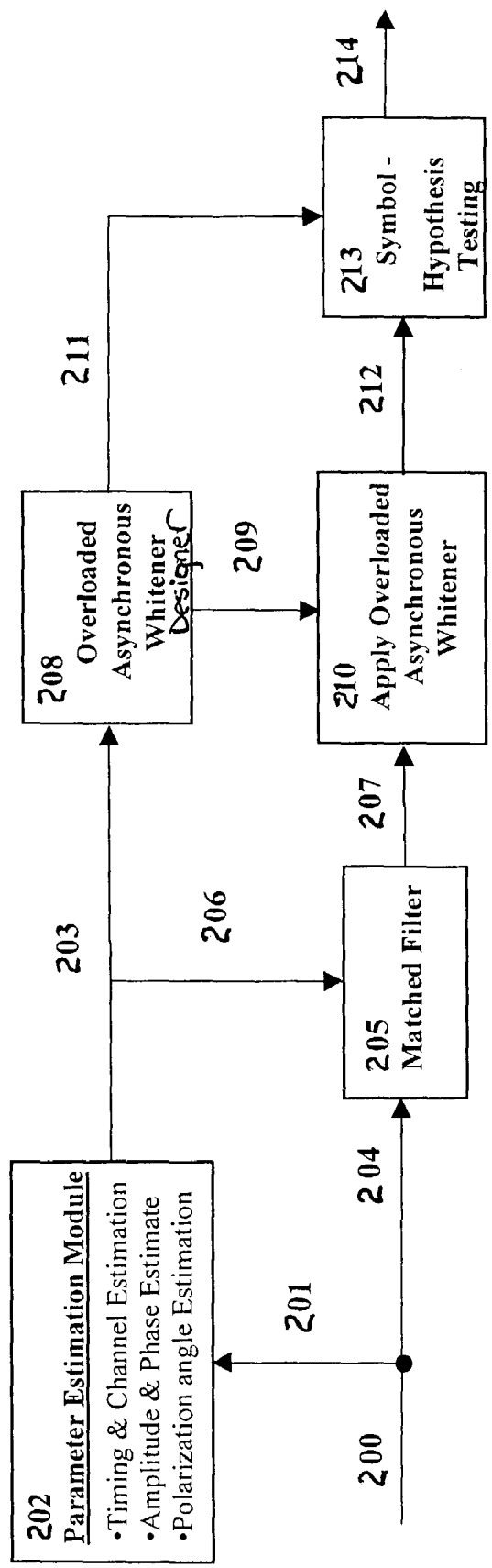
FIG. 16 implements an M-algorithm based on prewhitened data in accordance with an embodiment of the present invention.

The data to be processed by the MUD can be prewhitened in a manner that partially decouples the users from multiple access interference, which dramatically improves performance. FIG. 16 implements an M-algorithm based on prewhitened data in accordance with an embodiment of the present invention. Modules 205, 208, 210, and 213 of this embodiment could be used, for example, to implement the Multiuser Detector 18 of FIGS. 1–3.

The apparatus in FIG. 16 is now described in more detail. A data stream 200, potentially complex, is received from some source. For the case of Code Division Multiple Access (CDMA) communications schemes, the data stream is sampled by some multiple of the chip rate. For TDMA communication schemes, the data stream is sampled at some multiple of the symbol rate.

The data 200 represents a vector of data, transferred at some rate (e.g., the symbol rate). This data 200 is transmitted to the matched filter 205. In addition, the same vector 200 is passed on to the parameter estimation module 202. The purpose of the parameter estimation module is to estimate timing, signal amplitudes, phases, polarization, and identification of transmission channels. Estimates of the parameters are passed to design the matched filter bank 205 and estimates of the parameters are also passed to design the corresponding whitener 208.

Symbol hypothesis testing, conducted in 213 of FIG. 16, could include the maximum likelihood detector which is expressed mathematically as, $$\hat{b}_{ML} = \underset{b}{\operatorname{argmin}} \|r - SAb\|^2. \quad (39)$$

Equation 39 is based on the linear model for the received samples illustrated by $$r = SAb + n_w, \quad (40)$$

which defines the received samples in terms of the transmitted bits, b, and a model of the channel defined in S. The maximum likelihood detector is a brute force approach which requires an exhaustive search. The maximum likelihood solution consists of exhaustively evaluating the Euclidean distance between the received samples and the linear model of the samples using every possible hypothesis of the bit sequence. It is too computationally intensive for problems with a large number of users or severe intersymbol interference from multipath. The approach considered here consists of a simplified version of the maximum likelihood detector that nearly achieves the same performance in a supersaturated environment with large savings in the number of computations. This approach is described as follows.

The maximum likelihood solution is rewritten as $$\hat{b}_{ML} = \underset{b}{\operatorname{argmin}} \{(r - SAb)^H \sum{}^{-1} (r - SAb)\}, \quad (41)$$

where $\Sigma$ represents the covariance of the noise, $n_w$. When the noise is white, the weighted least squares solution in Equation 41 is identical to the maximum likelihood detector in Equation 39. For any matrix W the weighted least squares solution in Equation 40 is identical to the following solution $$\hat{b}_{ML} = \underset{b}{\operatorname{argmin}} \{(w - WSAb)^H \sum_W{}^{-1} (w - WSAb)\}, \quad (42)$$

where $w = Wr$ and $\Sigma_w = W\Sigma W^H$. The motivation of exploring linear combinations of the received data, is because certain transformations allow for more efficient searches of the more likely bit-hypotheses. The notation in Equations 41–42 is based on the linear matrix representation for samples of received waveform based on the presence of all users (see Equation 40).

Let $$W = (A^H S^H SA)^{-1} A^H S^H, \quad (43)$$

then the filter bank defined by the matrix W is the filter bank used in the decorrelator receiver. The decorrelator receiver is attractive because it optimally mitigates the multiple access interference but does not account for the colored noise. Specifically, while the multiple access interference is eliminated, assuming known correlation matrix, the white noise component has been colored (when the signature waveforms are not orthonormal). A more suitable filter bank includes the inverse of the square root of the correlation matrix. This combination results in a filter bank that partially decouples the multiple access interference yet maintains uncorrelated noise components. The cascade of the square root filter and the matched filter represents an orthonormal set of filters that are closest in a least squares sense to the signature waveforms. A square root filter bank defined using the Cholesky factorization of the correlation matrix is one of the more attractive square root factorizations. The correlation matrix is represented in Equation 43 by $$H=(A^H S^H S A). \tag{44}$$

The Cholesky factorization of the correlation matrix H is defined by $$H=(A^H S^H S A)=(F^H F), \tag{45}$$

where F is an upper-triangular matrix. Therefore the whitening filter is defined as $F^{-H}$ which is a lower triangular matrix. Therefore, rather than utilize decorrelating filter bank in Equation 43, the following partial decorrelating filter bank, defined as $$W=F^{-H} A^H S^H, \tag{46}$$

which is more suitable for efficient searches of the weighted least squares solution. The attraction of this particular square root factorization is illustrated by $$w = F^{-H} A^H S^H r = Fb + z = \begin{bmatrix} F_{11} & F_{12} & F_{13} & F_{14} & \cdots & F_{1K} \\ 0 & F_{22} & F_{23} & F_{24} & \cdots & F_{2K} \\ 0 & 0 & F_{33} & F_{34} & \cdots & F_{3K} \\ 0 & 0 & 0 & F_{44} & \cdots & F_{4K} \\ \vdots & \vdots & \vdots & \vdots & \ddots & \vdots \\ 0 & 0 & 0 & 0 & \cdots & F_{KK} \end{bmatrix} \begin{bmatrix} b_1 \\ b_2 \\ b_3 \\ b_4 \\ \vdots \\ b_K \end{bmatrix} + \begin{bmatrix} z_1 \\ z_2 \\ z_3 \\ z_4 \\ \vdots \\ z_K \end{bmatrix}. \tag{47}$$

The partial decoupling of the co-channel interference is illustrated by the mean of the whitened output, w, defined to be Fb where F is an upper triangular matrix. Let the column vector, b, be ordered by user such that the top row represents the $1^{st}$ user and the bottom row represents the $K^{th}$ user. Computing the terms in Fb shows that the $K^{th}$ user is completely decoupled from all other user's bit hypotheses. Also the $(K-1)^{th}$ users bit hypothesis is only coupled with the bit hypothesis for user K. The term partial decoupling is used because the decisions for the (K–m) users are decoupled from any of the other users such that knowledge of the first 1 to (K–m–1) users are not required for making decisions on the later (K–m) users.

Continuing in this manner illustrates how measurements for any user have been decoupled from the actual bits of any "future" user. Note, the term "future" for user k refers to all users 1 through k–1.

The noise is whitened by using the partial decorrelator defined by $$W=F^{-H} A^H S^H. \tag{48}$$

The white noise is illustrated by $$F^{-H}(AS)^H E\{n_w n_w^H\}(AS)F^{-1} = \\ \sigma_w^2 F^{-H}(AS)^H(AS)F^{-1} = \sigma_w^2 I, \tag{49}$$

where I represents the identify matrix and E represents the expectation of the random variables. The diagonal covariance matrix proves that noise has been whitened using the partially decorrelating filter bank defined in Equation 48.

Substituting the decorrelating filter bank in Equation 48 into Equation 42, produces the same maximum likelihood solution.

The maximum likelihood expression in Equation 42 is rewritten in terms of the metric $\Omega(b)$ which is illustrated by $$\hat{b}_{ML} = \arg\min_b \Omega(b), \tag{50}$$

where $$\Omega(b) = \sum_{k=1}^{K} \left| w_k - \sum_{j=k}^{K} F_{kj} b_j \right|^2. \tag{51}$$

Using Equation 51, the search for the optimal set of bits can be reformulated in terms of a decision tree in which the metric characterizing the likelihood of the bit hypothesis for user k, $b_k$, is now represented by the component $$w_k - \sum_{j=k}^{K} F_{kj} b_j^2. \tag{52}$$

The term $b_k$ represents the bit hypothesis for user k and the term $w_k$ represents the filter bank output for filter k which has been matched to the signature waveform used by user k. The term $f_{jk}$ represents the Cholesky factor defined for users j and users k. The sequential nature of the ML metric is more clearly illustrated by the following expression. Each component of the summation (see Equation 52) can be considered as one of K stages of a decision tree. The following expression illustrates the first three terms of distance metric which would correspond to the components for the first three stages of the decision tree.

$$\Omega(b) = |w_K - F_{KK} b_K|^2 + |w_{(K-1)} - (F_{(K-1)(K-1)} b_{(K-1)} + F_{(K-1)K} b_K)|^2 + |w_{(K-2)} - (F_{(K-2)(K-2)} b_{(K-2)} + F_{(K-2)(K-1)} b_{(K-1)} + F_{(K-2)K} b_K)|^2 + \ldots \tag{53}$$

Figure 17:
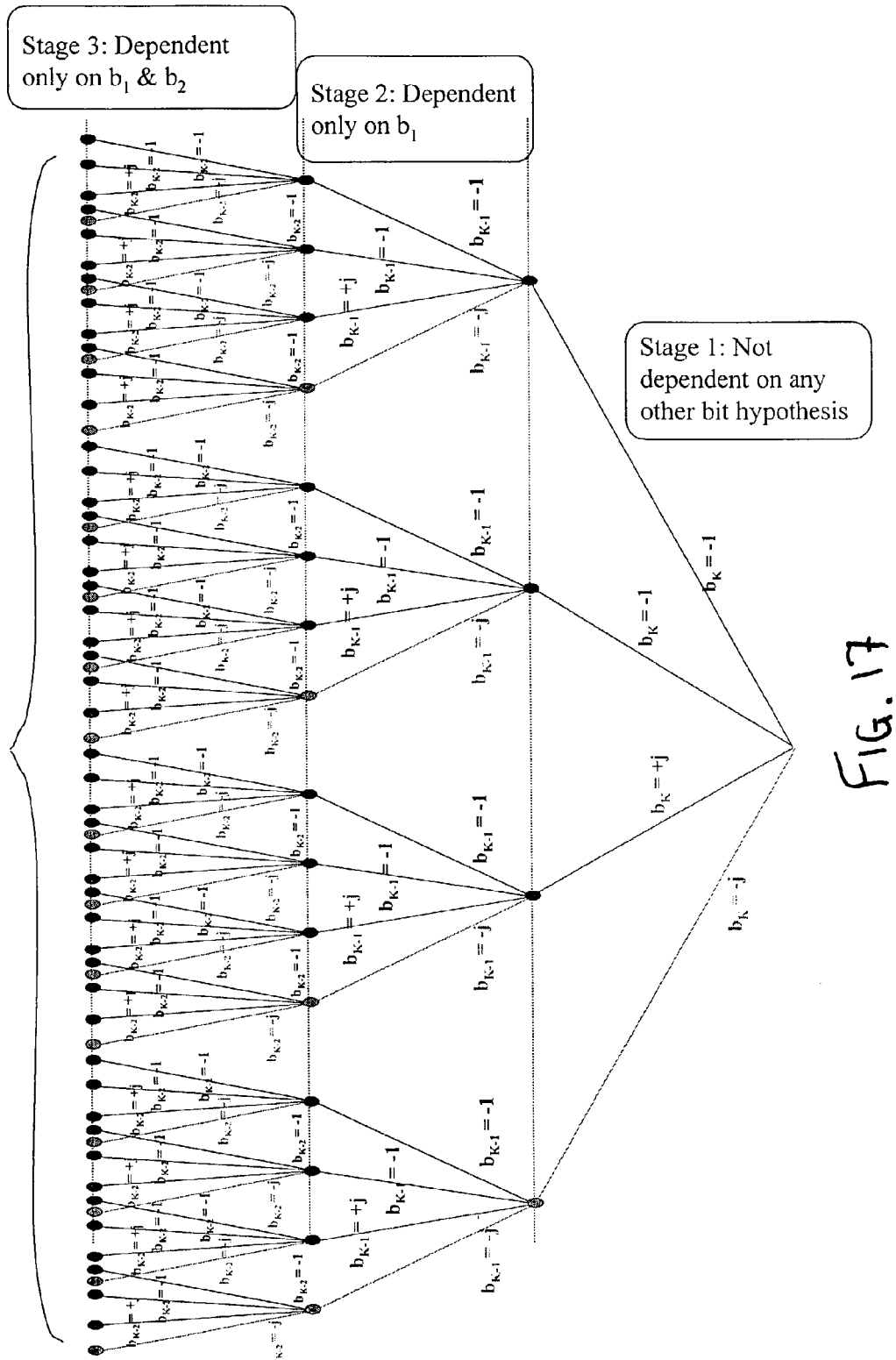
FIG. 17 demonstrates the symbol hypothesis testing based on sequential evaluation of metric characterizing likelihood of hypotheses in accordance with an embodiment of the present invention.

Evaluating the metric over these first three stages is illustrated in FIG. 17 for the QPSK alphabet. At the first stage, the first component $|w_K - F_{KK} b_K|^2$ assesses the likelihood of the four possible states for user K. As indicated by FIG. 17, this likelihood metric is not dependent on any other decisions on other user's bits. At the second stage, an estimate of the (K–1)th users bit, $b_{(K-1)}$, is based on the $|w_{(K-1)} - (F_{(K-1)(K-1)} b_{(K-1)} + F_{(K-1)K} b_K)|^2$. The decision at the second is based on the filtered data corresponding to user $b_{(K-1)}$ and the decision made for the K th user. Similarly, the estimate of the (K–2)th user is evaluated at the third stage using the third component of the distance metric, which is dependent on the previous two decisions. This continues for all K of these components. The trend shows that early decisions on users' bits are decoupled from "future" decisions made for the remaining users' bits.

Since the entire ML metric is a summation of K of these components, there are K stages to the decision tree. The jointly optimal decision requires each one of the branches of the decision tree must be explored. The decision tree approach still requires $4^K$ hypotheses to be evaluated for the QPSK case with no multipath. Expressing the problem in terms of a decision tree enables exploration of pruning techniques such as the M-algorithm or T-algorithm.

For the super-saturated communications problem, there are more users than statistically independent dimensions and therefore have an under-determined problem, such that the correlation matrix is positive semidefinite (i.e., not invertible). Since the correlation matrix is not invertible, the partial decorrelator in Equation 48 no longer exists because of the correlation between the channels.

A technique commonly used in regression analysis to combat multicolinearity is referred to as ridge regression. Multicolinearity results form high correlation between independent variables, which in this particular case corresponds to user's transmitted waveforms. Simply put ($A^H S^H SA$) has large off-diagonal terms producing an unstable correlation matrix with high condition numbers (i.e., ratio of maximum eigenvalue to lowest eigenvalue). In regression analysis, this produces estimates with very high variance. This is resolved by accepting a small bias to minimize the variance in the estimates. This is done by transforming the correlation matrix from ($A^H S^H SA$) to ($A^H S^H SA + \gamma I$), where $\gamma$ represents the diagonal loading. This raises the minimum eigenvalues to produce a more stable correlation matrix at the price of biased estimates in regression analysis.

The approach considered here is to alter the partial decorrelating filter bank by diagonally loading the correlation matrix thus intentionally introducing a bias with the objective of reducing the variance of the estimate which becomes more critical for the non-linear decision process inherent in the decision trees. Specifically, the new partial decorrelating filterbank is defined by $$W = F_\gamma^{-H} A^H S^H, \quad (54)$$

where the Cholesky factorization of the diagonally loaded correlation matrix is such that $$F_\gamma^H F_\gamma = (A^H S^H SA + \gamma I). \quad (55)$$

As previously mentioned, the concept of ridge regression consists of intentionally introducing a bias with the intention of reducing the variance of the estimates. Applying the partial decorrelating filter bank defined in Equation 54 to the received samples produces a vector K samples out of the filter bank defined by the K element column vector w. Applying the Equation 54 to the received samples is represented by $$w = F_\gamma^{-H} A^H S^H r. \quad (56)$$

Substituting the matrix model representation of the received samples, defined in Equation 40 provides the resulting simplification $$w = F_\gamma^{-H} H b + F_\gamma^{-H} A^H S^H n_w, \quad (57)$$

where the correlation matrix H is defined in Equation 44. Based on Equation 57, it is clear the bias that was intentionally introduced through diagonal loading using the noise variance is $$\Delta w = -\gamma F_\gamma^{-H} b. \quad (58)$$

The Cholesky factorization of the diagonally loading correlation matrix does not completely whiten the noise as indicated by the covariance of the noise term in Equation 57 which is defined by $$\sigma_n^2 I - \gamma \sigma_n^2 (F_\gamma F_\gamma^H)^{-1}. \quad (59)$$

For the case of reasonable signal to noise ratios and modest diagonal loading the noise covariance after applying the diagonally loaded based partial decorrelator is approximated by $\sigma_n^2 I$. In addition, for small diagonal loadings, the bias is considered small. Based on these approximations the weighted least squares solution is approximated by $$\hat{b}_{ML} = \arg\min_b \{(w - F_\gamma b)^H (w - F_\gamma b)\}. \quad (60)$$

As before, the maximum likelihood solution is express by $$\hat{b}_{ML} = \arg\min_b \Omega_\gamma(b), \quad (61)$$

where $$\Omega_\gamma(b) = \sum_{k=1}^{K} \left| w_k - \sum_{j=k}^{K} [F_\gamma]_{kj} b_j \right|^2. \quad (62)$$

The procedure for evaluating Equation 62 is consistent with the approach described in FIG. 17 in which the individual metrics described by $$\left| w_k - \sum_{j=k}^{K} [F_\gamma]_{kj} b_j \right|^2 \quad (63)$$

are evaluated at each node of the decision tree. Referring to FIG. 17, the transition from the previous stage to the current stage of a decision tree consists of an accrual of the individual metrics along the path of the decision tree. Various suboptimal pruning techniques, such as the M-algorithm and T-algorithm, are available for efficiently traversing the decision tree with a tolerable error rate.

FIG. 16 implements the algorithm described in Equations 55, 56, 61, and 62. Equation 56 consists of applying the Cholesky Factorization of a diagonally loaded correlation matrix following the application of the matched filter bank. Therefore, the matched filter bank described in Equation 56 is applied in 205. To complete the partial decorrelating filter bank, an overloaded asynchronous whitener application 210 is applied to the filtered data 207. The asynchronous whitener in 210 consists of applying the Cholesky factorization of the diagonally loaded correlation matrix described in Equation 55.

The purpose of the parameter estimation module, 202, is to estimate timing, signal amplitudes, phases, polarizations, and identification of active channels. Estimates of the parameters are used to model the channel which is required for application of the matched filter and development of the asynchronous decorrelating filter bank. The parameter estimation module provides the channel model 206 and the correlation matrix 203.

The purpose of the 208 is to design the whitener used in box 210. Box 208 utilizes the correlation matrix, 203, provided by the parameter estimation module to compute the diagonally loaded Cholesky Factorization described in Equation 55. The factorization is used for whitening in box 210 and used in hypothesis testing in box 213. Since this approach is an extension of decorrelating decision feedback detection, the concept of ordering the users by "decreasing received energies" is maintained such that the strongest users are evaluated first. This ordering defines the type of square-root matrix and must be maintained in the hypothesis testing module, 213. Variations include other ordering techniques, such as SNR based and likelihood based. The approach used in box 208 includes an asynchronous factorization that exploits the block-banded structure of the correlation matrix. The symbol synchronous problem is a degenerate case and therefore may be addressed by embodiments of the invention. Windowing based techniques may also be employed here.

Box 208 may also be adapted for reducing wordlengths and improving processing speed. For example, a QR factorization using Householder transformations implemented on a matrix that consists of signature waveform matrix augmented with diagonal matrix requires smaller wordlengths than the Cholesky factorization of the diagonally loaded correlation matrix. Algorithm implementations that use small wordlengths are more suitable for fixed-point processing hardware configurations. In addition, one embodiment of the invention includes the use of Hyperbolic Householder transformations in box 208 to efficiently update the whitener when only the received energies and/or phases change between symbol periods.

The square-root factorization of the correlation matrix produced in box 208 is used to whiten the data in box 210. Embodiments of the invention can be adapted to cover two approaches to whitening the matched filtered data. The first approach can be based on applying a bank of filters defined by the inverse of the conjugate transpose of the square-root matrix. Since the square-root has been defined with a triangular structure a whitening procedure using back-substitution can be implemented. This alternative approach requires less number of operations.

The whitened data stream exits box 210 and is passed to box 213 over the line 212. The square-root factorization defined in box 208 is passed to box 213 over line 211. This factorization is used in the metrics to sequentially evaluate the bit hypotheses in the decision tree which can be implemented using breadth-first techniques such as the M-algorithm or T-algorithm. Recall, the user ordering used to define the correlation matrix factorization and whitening filter is maintained in the symbol hypothesis testing module, box 213.

The purpose of box 213 is to efficiently investigate the more likely bit hypotheses for all K users. In one embodiment, the symbol hypothesis testing conducted in box 213, is based on sequential evaluation of metric characterizing likelihood of hypotheses described in FIG. 17. This evaluation is based on the metrics described in Equations 61 and 62.

The metric corresponding to a particular user's bit hypothesis at a stage in the decision tree will now be explained in words. The metric consists of the Euclidean distance between the output of the one of the whitening filters along the line 212 and the hypothesized mean signal energy based on the bit hypothesis for the user in question and the mean signal energy corresponding to the hypotheses selected for users previously tested. This mean signal energy is based on the Cholesky factorization of the diagonally loaded correlation matrix that was computed in box 208 and provided over line 211. The metric at each node of the decision tree illustrated in FIG. 17 includes the accumulation of metrics corresponding to previous decisions.

Unlike the decision feedback approaches, decisions are not immediately made. However, the approach considered here is a generalization of the decision feedback techniques and therefore include the decision feedback techniques. This sequential concept was observed in FIG. 17 and Equation 53 by expanding out the terms of the Euclidean distance between all the filter banks samples and the hypothesized mean signal based on arbitrary bit hypotheses. The output of box 213, are constrained estimates of the symbols for all users in the symbol period of interest, which are reported on line 214.

Various efficient decision tree search strategies can be employed in box 213. For example, the M-algorithm is one such approach that restricts the number of hypotheses at each stage to a fixed number. The T-algorithm is similar in nature to the M-algorithm, however, it restricts the number of hypotheses by comparing the accrued metric to a threshold. Variation of this approach and other efficient approaches to decision tree searches will be apparent in light of this disclosure.

There are numerous alternative embodiments for the Co-channel Interference Receiver configured in accordance with the principles of the present invention, as will be apparent in light of this disclosure. For example, the MUD conforms to various Turbo MUD designs and allows different combinations for the MUD core and error correction decoder. The MUD core can comprise MMSE MUD, windowed optimum MUD as well as various M-algorithm implementations. In addition, the convolutional error correction decoder in the turbo loop can comprise soft output Viterbi or soft output BCJR among others.

Embodiments of the invention may be implemented in software, hardware, firmware, or any combination thereof. For instance, the parameter estimation and MUD modules may be implemented in a set of instructions executing on a digital signal processor or other suitable processing environment. Alternatively, the modules can be implemented in purpose built silicon (e.g., ASIC, FPGA, or other system-on-a chip designs).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A co-channel interference receiver comprising:
   a multiuser detector module adapted to receive a complex signal that contains information from K co-channel interfering signals in the same frequency and time space, and configured to operate with at least one of a low complexity linear MMSE algorithm with partially quantized prior information and a low complexity M-algorithm based on prewhitened data; and a parameter estimation module adapted to receive the complex signal, and to generate estimated signature waveforms of each of the K co-channel interfering signals;

wherein the estimated signature waveforms are provided to the multiuser detector thereby enabling demodulation of the K co-channel interfering signals.

2. The receiver of claim 1 wherein the multiuser detector module and the parameter estimation module are each adapted to receive a plurality of complex signals.

3. The receiver of claim 1 further comprising:
an analog front end operatively coupled to the multiuser detector module and the parameter estimation module, the analog front end adapted to receive one or more composite waveform signals each from a plurality of transmitters, and to convert each received composite waveform signal to a corresponding complex signal.

4. The receiver of claim 3 wherein the analog front end includes:
one or more analog to digital converters, each adapted to convert a received composite waveform to a digital waveform; and
one or more downconverters, each operatively coupled to a respective analog to digital converter, and adapted to translate frequency associated with a received composite waveform to a lower frequency.

5. The receiver of claim 3 wherein the analog front end includes:
one or more antennas each configured to receive a corresponding composite waveform signal from the plurality of transmitters.

6. The receiver of claim 5 wherein the one or more antennas is a singly polarized antenna.

7. The receiver of claim 5 wherein the one or more antennas is a dual polarized antenna adapted with two polarization ports, thereby providing polarization diversity.

8. The receiver of claim 5 wherein the one or more antennas include two or more dual polarized antennas, each adapted with two polarization ports, thereby providing space and polarization diversity.

9. The receiver of claim 1 wherein the multiuser detector module is configured to operate with at least the low complexity linear MMSE algorithm with partially quantized prior information, and comprises:
a turbo MUD adapted to provide estimates of individual bits for each of the K co-channel interfering signals, wherein the estimates are iteratively applied in a feedback loop that includes an error correction module until an error rate associated with the bits drops below a predetermined figure;
a combiner module operatively coupled to the turbo MUD, and adapted to combine recomputed bit estimates output by the turbo MUD with quantized bit values on a next iteration; and
a thresholding module coupled to the output of the error correction module, and adapted to assign a quantized value for each bit estimate above a predetermined threshold, and to pass through those quantized bit values to the combiner module, thereby enabling partially quantized prior information.

10. The receiver of claim 9 wherein the error correction module on each subsequent iteration processes a combination of recomputed bit estimates output by the turbo MUD and quantized bit values output by the thresholding module, and provides its output back to the turbo MUD through the thresholding module, thereby reducing the number of uncertain bit estimates with every iteration.

11. The receiver of claim 1 wherein the multiuser detector module is configured to operate with at least the low complexity M-algorithm based on prewhitened data, and comprises:
a matched filter adapted to prewhiten complex signals received by the receiver, thereby partially decoupling users from multiple access interference;
a whitener designer module operatively coupled to the parameter estimator, and adapted to develop a model of each received complex signal based on parameter estimates from the parameter estimator, and to compute an asynchronous whitener module that whitens filtered data output by the matched filter; and
a symbol hypothesis testing module operatively coupled to the whitener designer module, and configured to receive whitened data output by the asynchronous whitener module, the symbol hypothesis testing module adapted to conduct symbol hypothesis testing based on sequential evaluation of metric characterizing likelihood of hypotheses.

12. The receiver of claim 11 wherein the whitener designer module utilizes a correlation matrix provided by the parameter estimation module to compute a diagonally loaded Cholesky Factorization, which is used for whitening in the whitening module, and is also used in hypothesis testing in the symbol hypothesis testing module.

13. The receiver of claim 11 wherein the whitener designer module employs a QR factorization using Householder transformations.

14. The receiver of claim 11 wherein the whitener designer module employs Hyperbolic Householder transformations to efficiently update the asynchronous whitener module when only received energies and/or phases change between symbol periods.

15. The receiver of claim 11 wherein the whitener designer module employs a square-root factorization.

16. The receiver of claim 11 wherein the asynchronous whitener module employs a correlation matrix square-root factorization produced by the whitener designer module to whiten data.

17. The receiver of claim 16 wherein the asynchronous whitener module employs a bank of filters defined by the inverse of the conjugate transpose of the correlation matrix square-root factorization.

18. The receiver of claim 16 wherein the correlation matrix square-root factorization has a triangular structure, and the asynchronous whitener module employs back-substitution.

19. The receiver of claim 11 wherein the symbol hypothesis testing module employs a correlation matrix square-root factorization produced by the whitener designer module in metrics to sequentially evaluate the bit hypotheses in a decision tree which is implemented using breadth-first techniques.

20. The receiver of claim 11 wherein parameter estimates of the parameter estimation module are used to model a channel associated with each received complex signal, thereby enabling application of the matched filter and development of an asynchronous decorrelating filter bank.

21. The receiver of claim 1 wherein the parameter estimation module is adapted to estimate signal parameters including at least one of timing, signal amplitudes, phases, polarizations, and identify of active channels.

22. The receiver of claim 1 wherein the parameter estimation module comprises:

a training sequence locator module adapted to estimate a training sequence location index in each frame of the received complex signal;

a noise estimator module adapted to calculate an estimate of an average noise power in the received complex signal in accordance with the training sequence location index;

a signature waveform estimator module adapted to estimate signature waveforms unique to each user in the received complex signal in accordance with the training sequence location index and a transformation matrix;

an active user tester module operatively coupled to an output of the noise estimator module and to an output of the signature waveform estimator module, the active user tester module adapted to determine a number of active users associated with the received complex signal; and a transformation matrix rebuilder module operatively coupled to the active user tester module and to pre-stored known training sequences for each user, the transformation matrix rebuilder module adapted to generate the transformation matrix used by the signature waveform estimating module.

23. A co-channel interference receiver comprising:

a multiuser detector module adapted to receive a complex signal that contains information from K co-channel interfering signals, and configured to operates with at least one of a low complexity linear MMSE algorithm with partially quantized prior information and an algorithm based on prewhitened data, wherein said algorithm based on prewhitened data is selected from at least one of an M-algorithm and a T-algorithm; and a parameter estimation module adapted to receive the complex signal, and to generate estimated signature waveforms of each of the K co-channel interfering signals, wherein the estimated signature waveforms are provided to the multiuser detector thereby enabling demodulation of the K co-channel interfering signals.

24. A method for receiving a complex signal that contains information from K co-channel interfering signals, the method comprising:

estimating signature waveforms of each of the K co-channel interfering signals; and processing the complex signal based on the signature waveforms with at least one of:

a low complexity linear MMSE algorithm with partially quantized prior information, wherein the low complexity linear MMSE algorithm includes eliminating from each processing iteration consideration of those bits having an estimate value that exceeds a predetermined threshold, and wherein bit estimates exceeding the threshold are considered certain; and a low complexity M-algorithm based on prewhitened data.

25. The method of claim 24 wherein the low complexity M-algorithm algorithm based on prewhitened data includes:

filtering the complex signal, thereby partially decoupling users from multiple access interference and providing prewhitened data;

developing a model of the received complex signal based on parameter estimates;

computing an asynchronous whitener based on the model for whitening the prewhitened data; and conducting symbol hypothesis testing based on sequential evaluation of metric characterizing likelihood of hypotheses.

* * * * *

UNITED STATES PATENT AND TRADEMARK OFFICE
CERTIFICATE OF CORRECTION

PATENT NO. : 7,092,452 B2  Page 1 of 4
APPLICATION NO. : 10/423740
DATED : August 15, 2006
INVENTOR(S) : Taylor et al.

It is certified that error appears in the above-identified patent and that said Letters Patent is hereby corrected as shown below:

Column 16, the equation after line 32 where:

$$``\quad \underline{\underline{D}}_k^{(N \times N_t)} = \begin{bmatrix} d_k(1) & 0 & \cdots & 0 \\ d_k(2) & d_k(1) & \ddots & \vdots \\ \vdots & d_k(2) & \ddots & 0 \\ \vdots & \vdots & \ddots & d_k(1) \\ d_k(N_d) & \vdots & \ddots & d_k(2) \\ 0 & d_k(N_d) & \ddots & \vdots \\ \vdots & \ddots & \ddots & \vdots \\ 0 & \cdots & 0 & d_k(N_d) \end{bmatrix} \quad ; \quad \underline{s}_k(p)^{(N_t \times 1)} = \begin{bmatrix} s_k(1,p) \\ s_k(2,p) \\ \vdots \\ s_k(N_t,p) \end{bmatrix} \quad ''$$

should be $$-\quad \underline{\underline{D}}_k^{(N \times N_t)} = \begin{bmatrix} d_k(1) & 0 & \cdots & 0 \\ d_k(2) & d_k(1) & \ddots & \vdots \\ \vdots & d_k(2) & \ddots & 0 \\ \vdots & \vdots & \ddots & d_k(1) \\ d_k(N_d) & \vdots & \ddots & d_k(2) \\ 0 & d_k(N_d) & \ddots & \vdots \\ \vdots & \ddots & \ddots & \vdots \\ 0 & \cdots & 0 & d_k(N_d) \end{bmatrix} \quad ; \quad \underline{s}_k(p)^{(N_t \times 1)} = \begin{bmatrix} s_k(1,p) \\ s_k(2,p) \\ \vdots \\ s_k(N_t,p) \end{bmatrix} \quad -$$

UNITED STATES PATENT AND TRADEMARK OFFICE
CERTIFICATE OF CORRECTION

PATENT NO. : 7,092,452 B2
APPLICATION NO. : 10/423740
DATED : August 15, 2006
INVENTOR(S) : Taylor et al.

It is certified that error appears in the above-identified patent and that said Letters Patent is hereby corrected as shown below:

Column 20, the equation after line 49

" $\underline{\underline{B}}_k^{((N_b+N_s-1)\times N_s)} = \begin{bmatrix} b_k(1) & 0 & \cdots & 0 \\ b_k(2) & b_k(1) & \cdots & \vdots \\ \vdots & b_k(2) & \cdots & 0 \\ \vdots & \vdots & \cdots & b_k(1) \\ b_k(N_b) & \vdots & \cdots & b_k(2) \\ 0 & b_k(N_b) & \cdots & \vdots \\ \vdots & \cdots & \cdots & \vdots \\ 0 & \cdots & 0 & b_k(N_b) \end{bmatrix}$ "

should be

-- $\underline{\underline{B}}_k^{((N_b+N_s-1)\times N_s)} = \begin{bmatrix} b_k(1) & 0 & \cdots & 0 \\ b_k(2) & b_k(1) & \ddots & \vdots \\ \vdots & b_k(2) & \ddots & 0 \\ \vdots & \vdots & \ddots & b_k(1) \\ b_k(N_b) & \vdots & \ddots & b_k(2) \\ 0 & b_k(N_b) & \ddots & \vdots \\ \vdots & \ddots & \ddots & \vdots \\ 0 & \cdots & 0 & b_k(N_b) \end{bmatrix}$ --

UNITED STATES PATENT AND TRADEMARK OFFICE
CERTIFICATE OF CORRECTION

PATENT NO. : 7,092,452 B2  Page 3 of 4
APPLICATION NO. : 10/423740
DATED : August 15, 2006
INVENTOR(S) : Taylor et al.

It is certified that error appears in the above-identified patent and that said Letters Patent is hereby corrected as shown below:

Column 26, the equation after line 25

"$\hat{\mathbf{b}}_{ML} = \arg\min_{\mathbf{b}}\{(\mathbf{r} - \mathbf{SAb})^H \Sigma^{-1} (\mathbf{r} - \mathbf{SAb})\}$" should be -- $\hat{\mathbf{b}}_{ML} = \arg\min_{\mathbf{b}}\{(\mathbf{r} - \mathbf{SAb})^H \Sigma^{-1} (\mathbf{r} - \mathbf{SAb})\}$ --

Column 26, the equation after line 37

"$\hat{\mathbf{b}}_{ML} = \arg\min_{\mathbf{b}}\{(\mathbf{w} - \mathbf{WSAb})^H \Sigma_W^{-1} (\mathbf{w} - \mathbf{WSAb})\}$" should be -- $\hat{\mathbf{b}}_{ML} = \arg\min_{\mathbf{b}}\{(\mathbf{w} - \mathbf{WSAb})^H \Sigma_W^{-1} (\mathbf{w} - \mathbf{WSAb})\}$ --

UNITED STATES PATENT AND TRADEMARK OFFICE
CERTIFICATE OF CORRECTION

PATENT NO. : 7,092,452 B2
APPLICATION NO. : 10/423740
DATED : August 15, 2006
INVENTOR(S) : Taylor et al.

It is certified that error appears in the above-identified patent and that said Letters Patent is hereby corrected as shown below:

Column 27, the equation after line 21

$$\mathbf{w} = \mathbf{F}^{-H}\mathbf{A}^{H}\mathbf{S}^{H}\mathbf{r} = \mathbf{Fb} + \mathbf{z} = \begin{bmatrix} F_{11} & F_{12} & F_{13} & F_{14} & \cdots & F_{1K} \\ 0 & F_{22} & F_{23} & F_{24} & \cdots & F_{2K} \\ 0 & 0 & F_{33} & F_{34} & \cdots & F_{3K} \\ 0 & 0 & 0 & F_{44} & \cdots & F_{4K} \\ \vdots & \vdots & \vdots & \vdots & \ddots & \vdots \\ 0 & 0 & 0 & 0 & \cdots & F_{KK} \end{bmatrix} \begin{bmatrix} b_1 \\ b_2 \\ b_3 \\ b_4 \\ \vdots \\ b_K \end{bmatrix} + \begin{bmatrix} z_1 \\ z_2 \\ z_3 \\ z_4 \\ \vdots \\ z_K \end{bmatrix}$$

should be $$-- \quad \mathbf{w} = \mathbf{F}^{-H}\mathbf{A}^{H}\mathbf{S}^{H}\mathbf{r} = \mathbf{Fb} + \mathbf{z} = \begin{bmatrix} F_{11} & F_{12} & F_{13} & F_{14} & \cdots & F_{1K} \\ 0 & F_{22} & F_{23} & F_{24} & \cdots & F_{2K} \\ 0 & 0 & F_{33} & F_{34} & \cdots & F_{3K} \\ 0 & 0 & 0 & F_{44} & \cdots & F_{4K} \\ \vdots & \vdots & \vdots & \vdots & \ddots & \vdots \\ 0 & 0 & 0 & 0 & \cdots & F_{KK} \end{bmatrix} \begin{bmatrix} b_1 \\ b_2 \\ b_3 \\ b_4 \\ \vdots \\ b_K \end{bmatrix} + \begin{bmatrix} z_1 \\ z_2 \\ z_3 \\ z_4 \\ \vdots \\ z_K \end{bmatrix} \quad --$$

Signed and Sealed this

Fifth Day of August, 2008

JON W. DUDAS
*Director of the United States Patent and Trademark Office*